US012750843B2

(12) United States Patent
Atungsiri et al.

(10) Patent No.: US 12,750,843 B2
(45) Date of Patent: Sep. 29, 2026

(54) METHODS, COMMUNICATIONS DEVICE AND INFRASTRUCTURE EQUIPMENT FOR A NON-TERRESTRIAL NETWORK

(71) Applicant: Sony Group Corporation, Tokyo (JP)

(72) Inventors: Samuel Asangbeng Atungsiri, Basingstoke (GB); Martin Warwick Beale, Basingstoke (GB); Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 403 days.

(21) Appl. No.: 18/268,623

(22) PCT Filed: Dec. 31, 2021

(86) PCT No.: PCT/EP2021/087905

§ 371 (c)(1),
(2) Date: Jun. 21, 2023

(87) PCT Pub. No.: WO2022/148711

PCT Pub. Date: Jul. 14, 2022

(65) Prior Publication Data

US 2024/0064735 A1 Feb. 22, 2024

(30) Foreign Application Priority Data

Jan. 7, 2021 (EP) .................................... 21150619

(51) Int. Cl.
*H04W 72/1268* (2023.01)
*H04W 72/0446* (2023.01)
*H04W 84/06* (2009.01)

(52) U.S. Cl.
CPC ... *H04W 72/1268* (2013.01); *H04W 72/0446* (2013.01); *H04W 84/06* (2013.01)

(58) Field of Classification Search
None
See application file for complete search history.

(56) References Cited

U.S. PATENT DOCUMENTS

2012/0207040 A1* 8/2012 Comsa .............. H04W 72/1215 370/252
2013/0027556 A1* 1/2013 Clark ...................... G08B 21/24 348/148

(Continued)

OTHER PUBLICATIONS

International Search Report and Written Opinion mailed on Apr. 7, 2022, received for PCT Application PCT/EP2021/087905, filed on Dec. 31, 2021, 14 pages.

(Continued)

*Primary Examiner* — Lonnie V Sweet
(74) *Attorney, Agent, or Firm* — XSENSUS LLP

(57) ABSTRACT

A method for use in a mobile telecommunications system comprising a Non-Terrestrial Network “NTN”, the network comprising a base station and a terminal configured to communicate with the base station via an air interface provided by infrastructure equipment of the NTN. The method comprises the terminal receiving a downlink signal from the base station; determining that a first uplink transmission is to be transmitted; determining that the terminal will obtain, during a first time period, position information; the base station scheduling first uplink resources for the terminal to transmit the first uplink transmission, wherein the first uplink resources are scheduled at a point in time selected after the first time period; in response to the downlink signal and during the first time period, the terminal obtaining position information; and the terminal transmitting, using the obtained position information, the first uplink transmission to the base station using the first uplink resources.

16 Claims, 9 Drawing Sheets

(56) References Cited

U.S. PATENT DOCUMENTS

| | | | | |
|---|---|---|---|---|
| 2015/0381396 | A1* | 12/2015 | Chen | H04L 41/0803 370/254 |
| 2020/0295824 | A1* | 9/2020 | Charbit | H04L 1/1864 |
| 2022/0021485 | A1* | 1/2022 | Singh | H04L 1/1819 |
| 2022/0264497 | A1* | 8/2022 | Wiacek | H04W 56/005 |
| 2022/0377698 | A1* | 11/2022 | Wang | G01S 13/765 |
| 2023/0123643 | A1* | 4/2023 | Fomenko | H04W 12/033 713/159 |
| 2024/0031786 | A1* | 1/2024 | Jung | H04W 4/46 |

OTHER PUBLICATIONS

3GPP, "Solutions for NR to support non-terrestrial networks (NTN) (Release 16)", 3GPP TR 38.821 V16.0.0, Dec. 2019, pp. 1-140.

Ericsson, "On UL time and frequency synchronization enhancements for NTN", 3GPP TSG-RAN WG1 Meeting #102-e, R1-2005502, Aug. 17-28, 2020, 13 pages.

Holma et al., "LTE for UMTS OFDMA and SC-FDMA Based Radio Access", John Wiley & Sons, 2009, 450 pages.

Nokia et al., "Timing Advance, Random Access and DRX aspects in NTN", 3GPP TSG-RAN WG2 Meeting #111, R2-2007590, Aug. 17-28, 2020, 9 pages.

OPPO, "Discussion on timing advance in NTN RACH", 3GPP TSG-RAN WG2 Meeting #107, R2-1909753, Aug. 26-30, 2019, 3 pages.

3GPP, "Study on New Radio (NR) to support non-terrestrial networks (Release 15)", 3GPP TR 38.811 V15.4.0, Sep. 2020, pp. 1-127.

* cited by examiner

METHODS, COMMUNICATIONS DEVICE AND INFRASTRUCTURE EQUIPMENT FOR A NON-TERRESTRIAL NETWORK

CROSS-REFERENCE TO RELATED APPLICATIONS

The present application is based on PCT filing PCT/EP2021/087905, filed Dec. 31, 2021, which claims the Paris Convention priority of European patent application EP21150619.1, filed Jan. 7, 2021, the contents of each of which are hereby incorporated by reference.

BACKGROUND

Field

The present disclosure relates generally to communications devices, infrastructure equipment and methods of operating communications devices and infrastructure equipment, and specifically to providing information regarding non-terrestrial infrastructure of a non-Terrestrial Network, NTN, to a communications device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the third generation partnership project (3GPP) defined UMTS and Long Term Evolution (LTE) architectures, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example, it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles. There is similarly expected to be a desire for such connectivity to be available over a wide geographic area.

One example area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1]. Other NTN relevant discussions are also provided in TR 38.821 [3].

Non-terrestrial networks may provide service in areas that cannot be covered by terrestrial cellular networks (i.e. those where coverage is provided by means of land-based antennas), such as isolated or remote areas, on board aircraft or vessels, or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY

The invention is defined in the appended independent claims. The present disclosure includes example arrangements falling within the scope of the claims (and other arrangements may also be within the scope of the following claims) and may also include example arrangements that do not necessarily fall within the scope of the claims but which are then useful to understand the invention and the teachings and techniques provided herein.

According to a first aspect of the present disclosure, there is provided a method of operating a base station in a mobile telecommunications system comprising a Non-Terrestrial Network "NTN", the network comprising the base station and a terminal configured to communicate with the base station via an air interface provided by infrastructure equipment of the NTN. The method comprises determining that a first uplink transmission is to be transmitted by the terminal; determining that the terminal will obtain, during a first time period, position information for the terminal; and scheduling first uplink resources for the terminal to transmit the first uplink transmission, wherein the first uplink resources are scheduled at a point in time selected after the first time period.

According to a second aspect of the present disclosure, there is provided a method of operating a terminal in a mobile telecommunications system comprising a Non-Terrestrial Network "NTN", the network comprising a base station and the terminal configured to communicate with the base station via an air interface provided by infrastructure equipment of the NTN. The method comprises receiving a downlink signal from the base station; in response to the downlink signal and during a first time period, obtaining position information for the terminal; synchronising with the base station using the obtained position information; and once synchronised, transmitting a first uplink transmission to the base station.

According to a third aspect of the present disclosure, there is provided a method for use in a mobile telecommunications system comprising a Non-Terrestrial Network "NTN", the network comprising a base station and a terminal configured to communicate with the base station via an air interface provided by infrastructure equipment of the NTN. The method comprises the terminal receiving a downlink signal from the base station; determining that a first uplink transmission is to be transmitted by the terminal; determining that the terminal will obtain, during a first time period, position information for the terminal; the base station scheduling first uplink resources for the terminal to transmit the first uplink transmission, wherein the first uplink resources are scheduled at a point in time selected after the first time period; in response to the downlink signal and during the first time period, the terminal obtaining position information for the terminal; and the terminal transmitting, using the obtained position information, the first uplink transmission to the base station using the first uplink resources.

According to a fourth aspect of the present disclosure, there is provided a base station for use in a mobile telecommunications system comprising a Non-Terrestrial Network "NTN", the network comprising the base station and a terminal configured to communicate with the base station via an air interface provided by infrastructure equipment of the NTN. The base station is configured to: determine that a first uplink transmission is to be transmitted by the terminal; determine that the terminal will obtain, during a first time period, position information for the terminal; and schedule first uplink resources for the terminal to transmit the first uplink transmission, wherein the first uplink resources are scheduled at a point in time selected after the first time period.

According to a fifth aspect of the present disclosure, there is provided circuitry for a base station in a mobile telecommunications system comprising a Non-Terrestrial Network "NTN" wherein the circuitry comprises a controller element and a transceiver element configured to operate together to connect to a terminal of the network via an air interface provided by infrastructure equipment of the NTN, wherein the controller element and the transceiver element are further configured to operate together to determine that a first uplink transmission is to be transmitted by the terminal; determine that the terminal will obtain, during a first time period, position information for the terminal; and schedule first uplink resources for the terminal to transmit the first uplink transmission, wherein the first uplink resources are scheduled at a point in time selected after the first time period.

According to a sixth aspect of the present disclosure, there is provided a terminal for use in a mobile telecommunications system comprising a Non-Terrestrial Network "NTN", the network comprising a base station and the terminal wherein the terminal is configured to communicate with the base station via an air interface provided by infrastructure equipment of the NTN. The terminal is further configured to: receive a downlink signal from the base station; obtain, in response to the downlink signal and during a first time period, position information for the terminal; synchronise with the base station using the obtained position information; and transmit, once synchronised, a first uplink transmission to the base station.

According to a seventh aspect of the present disclosure, there is provided a circuitry for a terminal in a mobile telecommunications system comprising a Non-Terrestrial Network "NTN" wherein the circuitry comprises a controller element and a transceiver element configured to operate together to connect to a base station of the network via an air interface provided by infrastructure equipment of the NTN, wherein the controller element and the transceiver element are further configured to operate together to receive a downlink signal from the base station; obtain, in response to the downlink signal and during a first time period, position information for the terminal; synchronise with the base station using the obtained position information; and transmit, once synchronised, a first uplink transmission to the base station.

According to an eighth aspect of the present disclosure, there is provided a system for use in a Non-Terrestrial Network "NTN", the system comprising a base station according to the fourth aspect and a terminal according to the sixth aspect.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
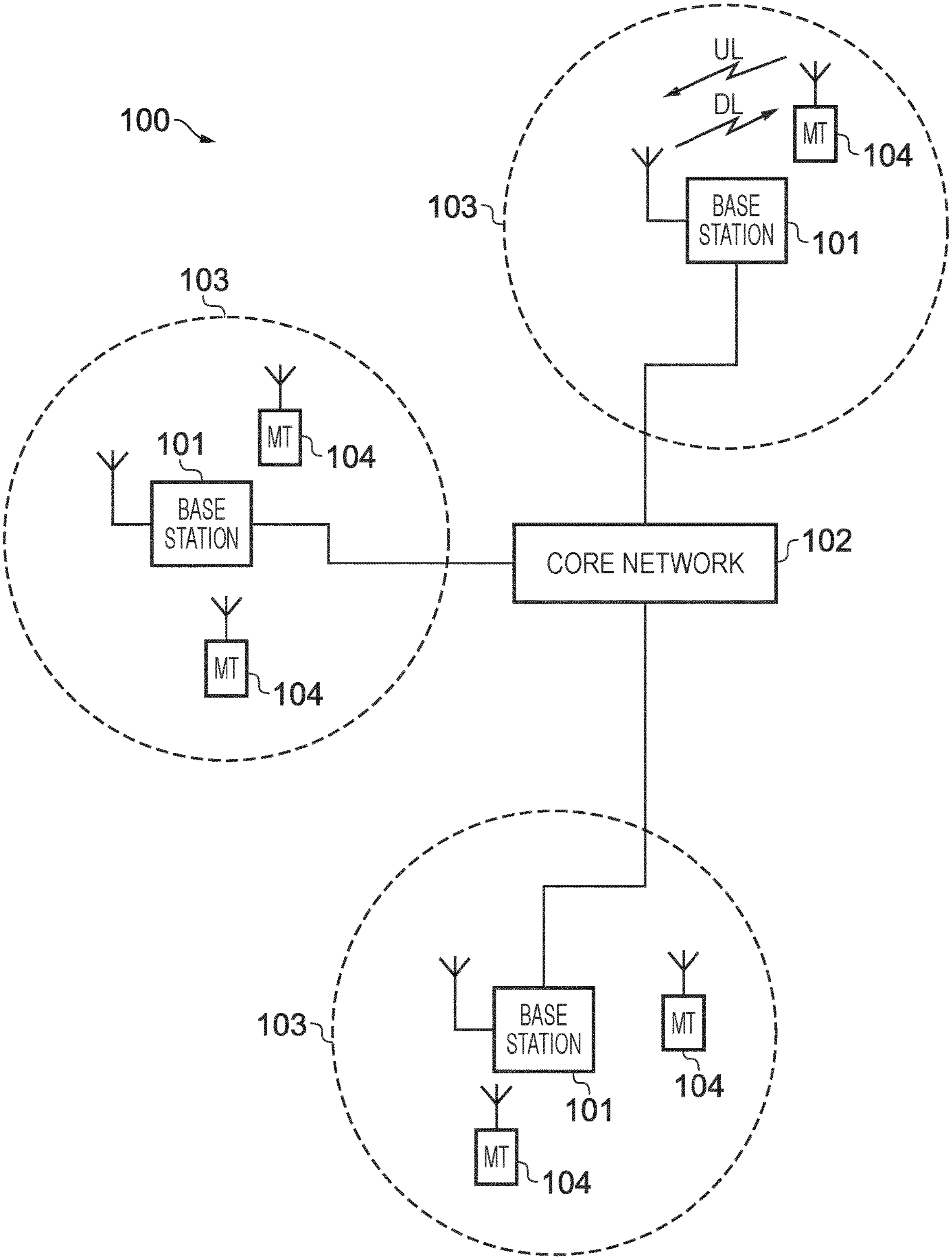
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs (eNB), g-nodeBs (gNB) and so forth. In this regard, different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity, certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
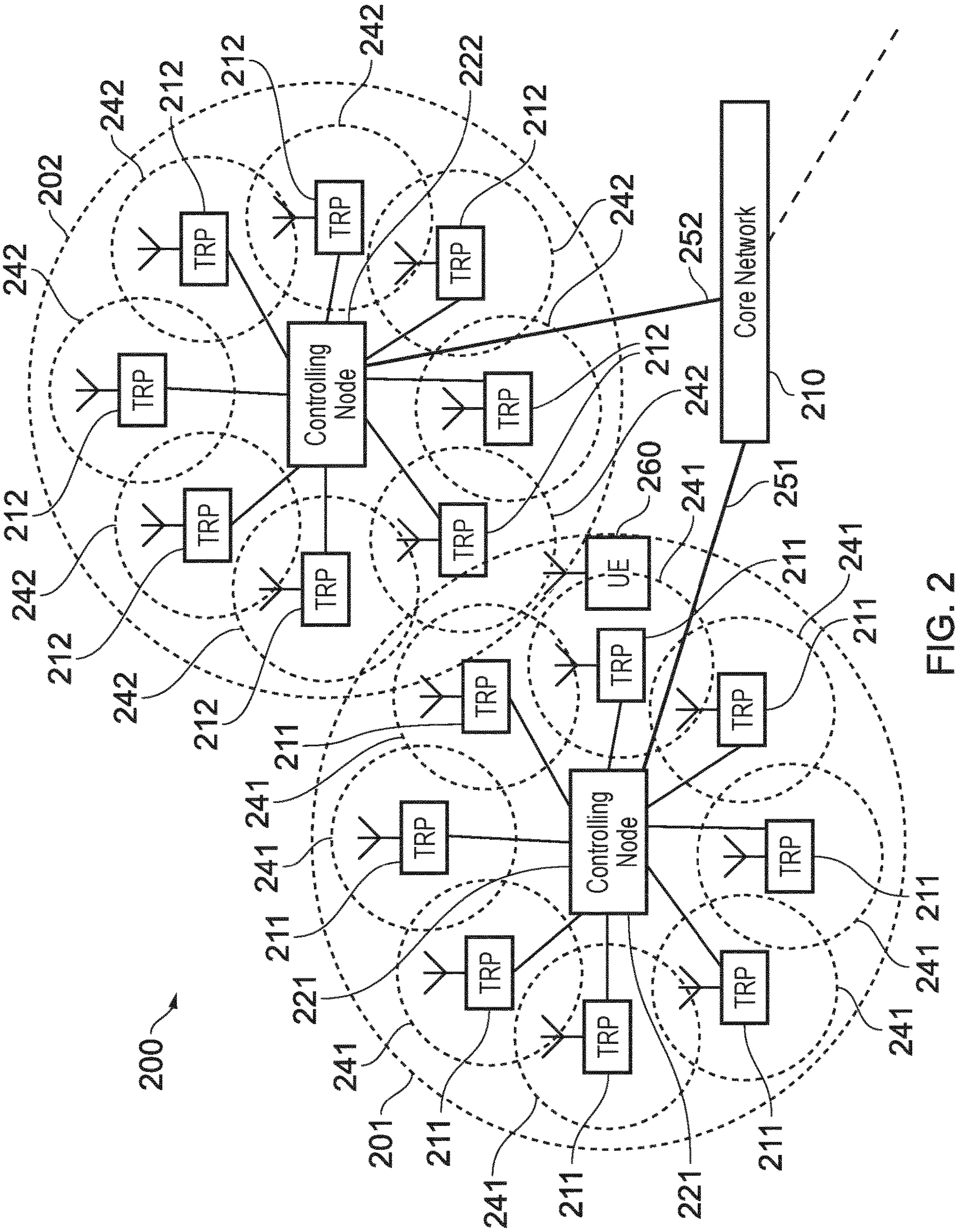
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
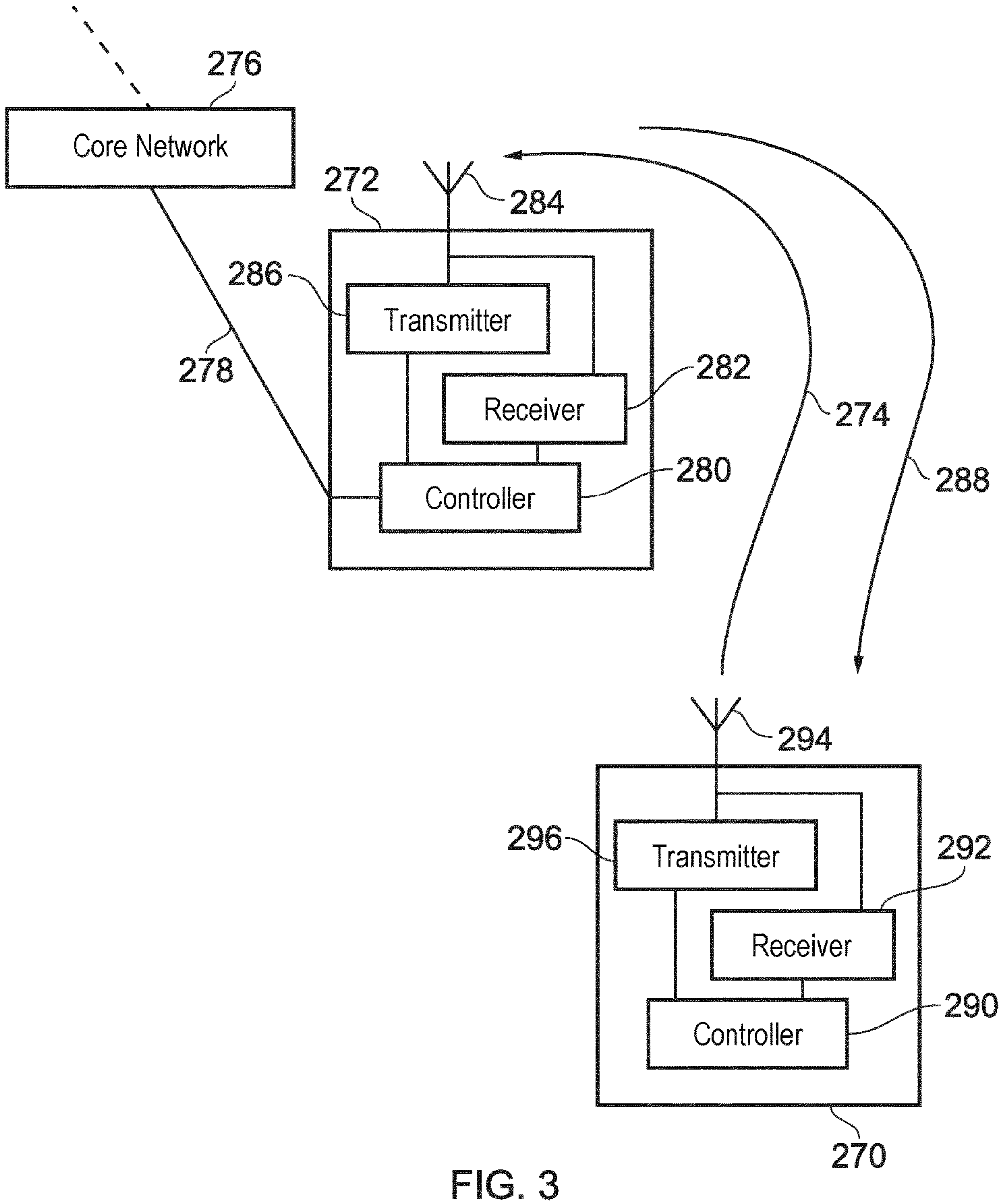
FIG. 3 is a schematic block diagram of an example infrastructure equipment and communications device configured in accordance with example embodiments.

A more detailed illustration of a communications device 270 and an example network infrastructure equipment 272, which may be thought of as an eNB or a gNB 101 or a combination of a controlling node 221 and TRP 211, is presented in FIG. 3. As shown in FIG. 3, the communications device 270 is shown to transmit uplink data to the infrastructure equipment 272 of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, which may be non-volatile memory, operating according to instructions stored on a computer readable medium.

Non-Terrestrial Networks (NTNs)

Figure 4:
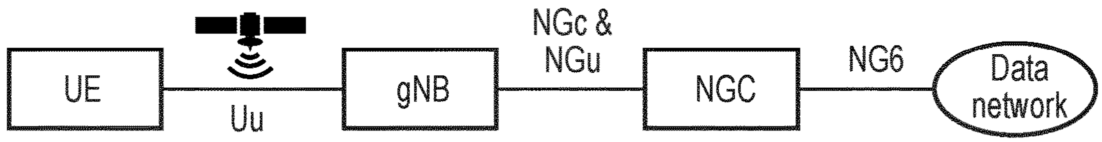
FIG. 4 is reproduced from [1], and illustrates a first example of a non-terrestrial network (NTN) featuring an access networking service relay node and based on a satellite/aerial platform with a bent pipe payload.
Figure 5:
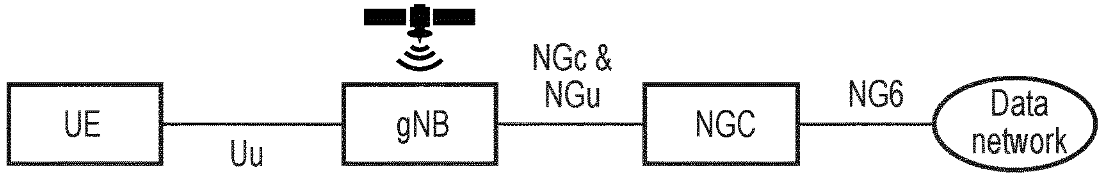
FIG. 5 is reproduced from [1], and illustrates a second example of an NTN featuring an access networking service relay node and based on a satellite/aerial platform connected to a gNodeB.

An overview of NR-NTN can be found in [1], and much of the following wording, along with FIGS. 4 and 5, has been reproduced from that document as a way of background.

As a result of the wide service coverage capabilities and reduced vulnerability of space/airborne vehicles to physical attacks and natural disasters, Non-Terrestrial Networks are expected to:

- foster the roll out of 5G service in un-served areas that cannot be covered by terrestrial 5G network (isolated/remote areas, on board aircrafts or vessels) and underserved areas (e.g. sub-urban/rural areas) to upgrade the performance of limited terrestrial networks in a cost effective manner;
- reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications; and to
- enable 5G network scalability by providing efficient multicast/broadcast resources for data delivery towards the network edges or even user terminal.

The benefits relate to either Non-Terrestrial Networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals:

transport, Public Safety, Media and Entertainment, eHealth, Energy, Agriculture, Finance and Automotive. It should also be noted that the same NTN benefits apply to 4G and/or LTE technologies and that while NR is sometimes referred to in the present disclosure, the teachings and techniques presented herein are equally applicable to 4G and/or LTE.

FIG. 4 illustrates a first example of an NTN architecture based on a satellite/aerial platform with a bent pipe payload, meaning that the same data is sent back down to Earth as is received by the satellite/aerial platform, with only frequency or amplification changing; i.e. acting like a pipe with a u-bend. In this example NTN, the satellite or the aerial platform will therefore relay a NR signal between the gNodeB (or eNodeB) and UEs in a transparent manner.

FIG. 5 illustrates a second example of an NTN architecture based on a satellite/aerial platform comprising a gNodeB (or eNodeB in the examples of this disclosure). In this example NTN, the satellite or aerial platform carries a full or part of a gNodeB to generate or receive a NR signal to/from the UEs. This requires the satellite or aerial platform to have sufficient on-board processing capabilities to be able to include a gNodeB or eNodeB functionality.

Figure 6:
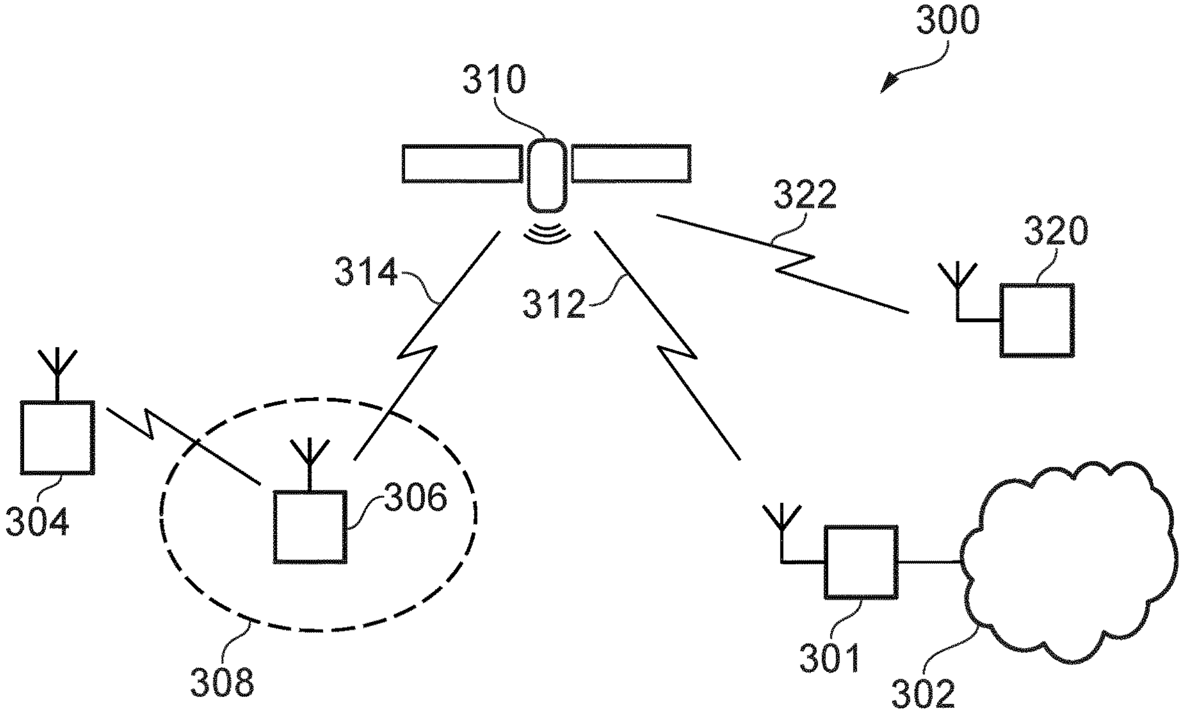
FIG. 6 schematically shows an example of a wireless communications system comprising an NTN part and a terrestrial network (TN) part which may be configured to operate in accordance with embodiments of the present disclosure.

FIG. 6 schematically shows an example of a wireless communications system 300 which may be configured to operate in accordance with embodiments of the present disclosure. The wireless communications system 300 in this example is based broadly around an LTE-type or 5G-type architecture. Many aspects of the operation of the wireless communications system/network 300 are known and understood and are not described here in detail in the interest of brevity. Operational aspects of the wireless communications system 300 which are not specifically described herein may be implemented in accordance with any known techniques, for example according to the current LTE-standards or the proposed 5G standards.

The wireless communications system 300 comprises a core network part 302 (which may be a 4G core network or a 5G core network) in communicative connection with a radio network part. The radio network part comprises a terrestrial station 301 connected to a non-terrestrial network part 310. The non-terrestrial network part 310 may be an example of infrastructure equipment. Alternatively, or in addition, the non-terrestrial network part 310 may be mounted on a satellite vehicle or on an airborne vehicle. In some cases, the base station (e.g. g-Node B/e-node B) may be fully implemented in the terrestrial station 301 or in the non-terrestrial network part 310, or may be partially implemented in one or both of the terrestrial station 301 or in the non-terrestrial network part 310.

The non-terrestrial network part 310 may communicate with a communications device 306, located within a cell 308, by means of a wireless access interface provided by a wireless communications link 314. For example, the cell 308 may correspond to the coverage area of a spot beam generated by the non-terrestrial network part 310. The boundary of the cell 308 may depend on an altitude of the non-terrestrial network part 310 and a configuration of one or more antennas of the non-terrestrial network part 310 by which the non-terrestrial network part 310 transmits and receives signals on the wireless access interface.

The non-terrestrial network part 310 may be a satellite in an orbit with respect to the Earth, or may be mounted on such a satellite. For example, the satellite may be in a geo-stationary earth orbit (GEO) such that the non-terrestrial network part 310 does not move with respect to a fixed point on the Earth's surface. The geo-stationary earth orbit may be approximately 36,786 km above the Earth's equator. The satellite may alternatively be in a low-earth orbit (LEO), in which the non-terrestrial network part 310 may complete an orbit of the Earth relatively quickly, thus providing moving cell coverage. Alternatively, the satellite may be in a non-geostationary orbit (NGSO), so that the non-terrestrial network part 310 moves with respect to a fixed point on the Earth's surface. The non-terrestrial network part 310 may be an airborne vehicle such as an aircraft, or may be mounted on such a vehicle. The airborne vehicle (and hence the non-terrestrial network part 310) may be stationary with respect to the surface of the Earth or may move with respect to the surface of the Earth.

In FIG. 6, the terrestrial station 301 is shown as ground-based, and connected to the non-terrestrial network part 310 by means of a wireless communications link 312. The non-terrestrial network part 310 receives signals representing downlink data transmitted by the terrestrial station 301 on the wireless communications link 312 and, based on the received signals, transmits signals representing the downlink data via the wireless communications link 314 providing the wireless access interface for the communications device 306. Similarly, the non-terrestrial network part 310 receives signals representing uplink data transmitted by the communications device 306 via the wireless access interface comprising the wireless communications link 314 and transmits signals representing the uplink data to the terrestrial station 301 on the wireless communications link 312. The wireless communications links 312, 314 may operate at a same frequency, or may operate at different frequencies The extent to which the non-terrestrial network part 310 processes the received signals may depend upon a processing capability of the non-terrestrial network part 310. For example, the non-terrestrial network part 310 may receive signals representing the downlink data on the wireless communication link 312, amplify them and (if needed) re-modulate onto an appropriate carrier frequency for onwards transmission on the wireless access interface provided by the wireless communications link 314. Alternatively, the non-terrestrial network part 310 may be configured to decode the signals representing the downlink data received on the wireless communication link 312 into un-encoded downlink data, re-encode the downlink data and modulate the encoded downlink data onto the appropriate carrier frequency for onwards transmission on the wireless access interface provided by the wireless communications link 314.

The non-terrestrial network part 310 may be configured to perform some of the functionality conventionally carried out by the base station. In particular, latency-sensitive functionality (such as acknowledging a receipt of the uplink data, or responding to a RACH request) may be performed by the non-terrestrial network part 310 partially implementing some of the functions of the base station.

As mentioned above, the base station may be co-located with the non-terrestrial network part 310; for example, both may be mounted on the same satellite vehicle or airborne vehicle, and there may be a physical (e.g. wired, or fibre optic) connection on board the satellite vehicle or airborne vehicle, providing the coupling between the base station and the non-terrestrial network part 310. In such co-located arrangements, a wireless communications feeder link between the base station and a terrestrial station 301 may provide connectivity between the base station (co-located with the non-terrestrial network part 310) and the core network part 302.

In some cases, the communications device 306 shown in FIG. 6 may be configured to act as a relay node. That is, it may provide connectivity to one or more terminal devices such as the terminal device 304. When acting as a relay node, the communications device 306 transmits and receives data to and from the terminal device 304, and relays it, via the non-terrestrial network part 310 to the terrestrial station 301. The communications device 306, acting as a relay node, may thus provide connectivity to the core network part 302 for terminal devices which are within a transmission range of the communications device 306.

In some cases, the non-terrestrial network part 310 is also connected to a ground station 320 via a wireless link 322. The ground station may for example be operated by the satellite operator (which may be the same as the mobile operator for the core and/or radio network or may be a different operator) and the link 322 may be used as a management link and/or to exchange control information. In some cases, once the non-terrestrial network part 310 has identified its current position and velocity, it can send position and velocity information to the ground station 320. The position and velocity information may be shared as appropriate, e.g. with one or more of the UE 306, terrestrial station 301 and base station, for configuring the wireless communication accordingly (e.g. via links 312 and/or 314).

It will be apparent to those skilled in the art that many scenarios can be envisaged in which the combination of the communications device 306 and the non-terrestrial network part 310 can provide enhanced service to end users. For example, the communications device 306 may be mounted on a passenger vehicle such as a bus or train which travels through rural areas where coverage by terrestrial base stations may be limited. Terminal devices on the vehicle may obtain service via the communications device 306 acting as a relay, which communicates with the non-terrestrial network part 310.

In NTN arrangements, the propagation delay of the link from the terminal via the satellite to the eNB is greater than that from the terminal to the eNB on terrestrial networks. In many cases, it is preferred that, for NTN, closed-loop procedures can take into account the increased round trip time (RTT) from the terminal to the eNB. For example, in such procedures, the network or terminal can initiate a hand-shaking or hand-shaking like procedure with the terminal or network (respectively) and each expects the other to respond within a given time period and typically in a given time window. For example, an access procedure (e.g. RACH procedure) is such a procedure, which can be used by the terminal once uplink synchronisation is acquired. For NTN systems, the terminal will first use relatively less accurate values for the frequency compensation and timing advance before initiating an access procedure. The terminal will use more accurate values after the random access has been initiated—for example using a more accurate timing advance signalled to the UE by the base station.

In some cases, the terminal is equipped with a Global Navigation Satellite System "GNSS" which is a positioning or localisation system. In such cases and in legacy systems, one means of achieving uplink synchronisation for an Idle mode terminal is as follows:

1. The terminal can acquire downlink synchronisation by detecting the Primary Synchronisation Signal (PSS) and Secondary Synchronisation Signal (SSS), receiving the Physical Broadcast Channel (PBCH) and decoding System Information (SI). The SI may provide the terminal with one or more of the following parameters: location of the satellite and/or eNB, the ephemeris information of the satellite from which the satellite orbital path can be determined, the length or RTT of the feeder link (link from the eNB to the satellite), GPS time reference, frequency offset due to doppler effect arising from movement of the satellite in its orbit, position and velocity of the satellite etc.
2. The terminal can use its on-board GNSS to acquire its location and/or time of arrival of the SI. With either of these combined with the information acquired from step 1, the terminal is able to compute its timing advance "TA" to the eNB. E.g. if the SI signals the position of the satellite and the terminal knows its own position via GNSS, the terminal can calculate or estimate the propagation time between the terminal and satellite and can hence determine the required timing advance. Similarly, knowing the relative positions of the terminal and satellite (via GNSS and SI information) and the velocities of the terminal and satellite, the terminal can calculate or estimate the Doppler between the terminal and satellite and hence the required frequency compensation.
3. The terminal can use the calculated or estimated TA to time synchronise and the frequency offset due to doppler shift duly adjusted for the difference between the uplink and downlink operating frequencies to pre-compensate the frequency of any uplink transmission from the terminal.

For example, we can consider a case where a terminal is in a DRX mode during which it has not exchanged data with the eNB for some time. In this case, its Doppler/TA information is out of date and is not sufficiently accurate for transmitting an uplink transmission (e.g. HARQ ACK/NACK in response to a PDSCH or a PUSCH transmission if the DRX ON contained an UL grant for the terminal). Accordingly, the terminal has to make a GNSS position measurement before it can transmit the uplink transmission. This could imply doing a GNSS measurement just before every DL DRX on, just in case the terminal has to transmit in the uplink.

Figure 7:
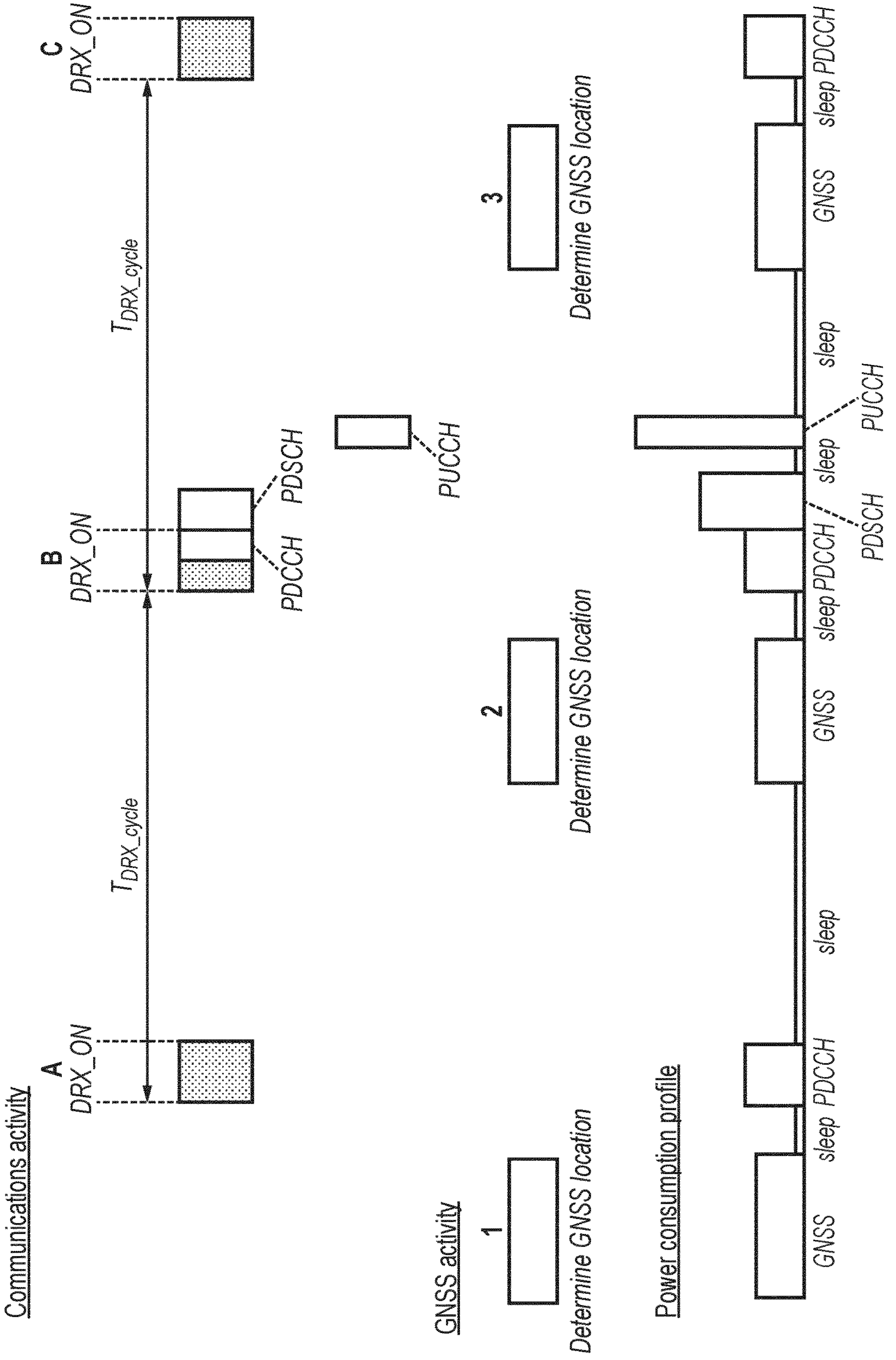
FIG. 7 illustrates the communications, GNSS and power consumption profile in an NTN example use case.

FIG. 7 illustrates the communications activity, GNSS activity and power consumption profile in an example use case. This use case, during DRX operation in an IoT NTN terminal, explores the situation mentioned above.

Just over two full DRX cycles are illustrated, with three DRX_ON periods (A,B,C). During the DRX_ON periods, the terminal has to monitor for PDCCH. While the terminal monitors PDCCH in each of the DRX_ON periods, in this example, it is only actually scheduled during DRX_ON period B. Accordingly, the terminal only actually has to transmit a PUCCH that is associated with the PDCCH/PDSCH from DRX_ON period B. The terminal requires up to date GNSS information in order to transmit the PUCCH at B with the correct timing advance and frequency compensation. The terminal then uses the GNSS information acquired at the GNSS procedure "2" in order to derive the estimated timing advance and frequency compensation to apply to and use for the PUCCH transmission.

The terminal does not know in advance whether it would be scheduled a downlink transmission during DRX_ON periods A and C either and thus had to derive GNSS measurements at GNSS procedures 1 and 3, to prepare for that eventuality, in case it had been scheduled in A and C.

The power consumption associated with these GNSS measurements in these two DRX cycles associated with A and C is wasted since, in the end, the terminal did not need to transmit in the uplink for the DRX cycles A or C.

However, without any visibility on whether or when position (e.g. GNSS) information for the terminal would be helpful, the terminal cannot anticipate when to carry out a positioning procedure and when such a positioning procedure would represent a waste of processing and power resources.

In accordance with the present disclosure, the power consumption associated with unnecessary GNSS measurements can be reduced, for example in respect of GNSS measurements prior to times at which the terminal potentially needs to transmit in the uplink but where the terminal did not actually have to transmit on the uplink.

In accordance with the present disclosure, when it is determined that the terminal will communicate on the uplink, the terminal is given a time period for performing a positioning procedure and the uplink transmission is delayed until after the positioning procedure has completed.

This may for example be used if the terminal has not been scheduled for a certain time period (e.g. for a duration greater than a predetermined threshold). In this case, the terminal can be provided with an extended time in which to send uplink signalling. The extended time can therefore be used by the terminal to acquire GNSS position (and, if appropriate, read the SIBs) to estimate the TA for its uplink transmission.

In one example, for a terminal that may not have valid timing advance and frequency compensation, any indication in the current downlink DRX cycle that requires an uplink transmission in response, is interpreted as indicating that the terminal should transmit with an additional delay, $\Delta T_2$. The additional delay, $\Delta T_2$, gives the terminal additional time which the terminal can use to acquire its GNSS position and achieve uplink synchronisation before it has to transmit.

Figure 8:
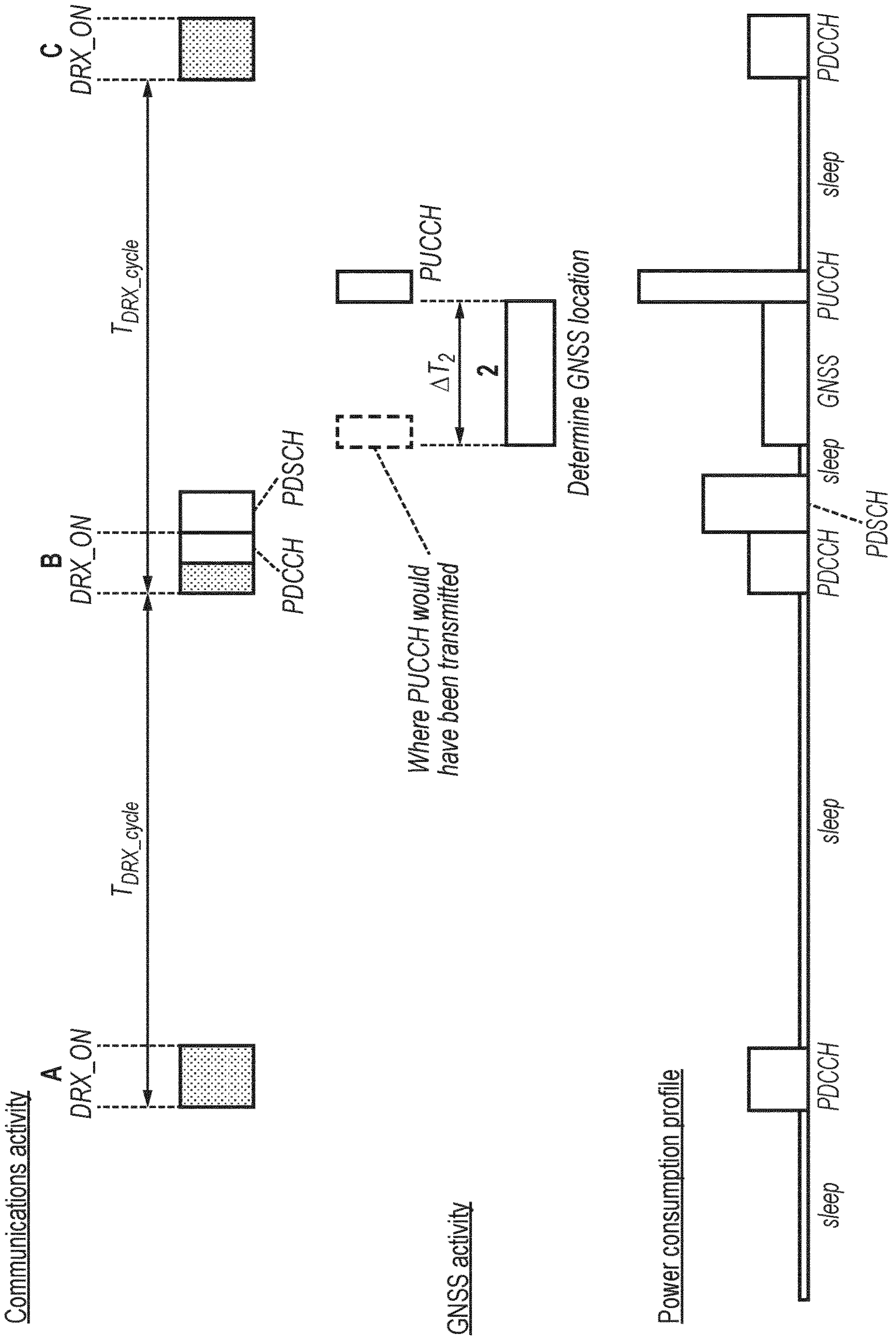
FIG. 8 illustrates an example of communications and GNSS activity and a power consumption profile in an NTN example.

FIG. 8 illustrates an example operation according to this example. The figure shows that, in comparison to FIG. 7, the terminal will not need to determine its GNSS location prior to every DRX_ON period (in case an uplink transmission might be scheduled in the next DRX cycle).

In this example, an acknowledgement transmission (e.g. an ACK/NACK, HARQ and/or PUCCH transmission) is delayed by a time $\Delta T_2$ in order to give the terminal time to determine its GNSS location. In this example, the terminal only needs to determine its GNSS location for the DRX_ON period where it is actually scheduled an uplink transmission. Said differently, the terminal performs one GNSS location determination procedure "2", associated with DRX_ON period "B" and does not have to perform corresponding procedures for DRX_ON periods A and C. As a result, and compared to FIG. 7, the power consumption is reduced, as shown in the power consumption profile of the FIG. 8.

In some examples, the acknowledgement transmission is only delayed by a time $\Delta T_2$ if it is determined by the UE and/or the eNodeB that the terminal's GNSS location is no longer valid. The terminal's GNSS location may be invalid if sufficient time has elapsed since a reference point in time such that the terminal may have moved to the extent that a derived timing advance or frequency compensation value is invalid.

In some examples, it is assumed that it can be determined whether the terminal is likely (or is expected) to need to update its position information in order to update its TA and frequency information. There may be different ways by which this can be estimated or decided.

In some cases this may be determined based on the use of one or more timers $T_1$ which can help indicate whether sufficient time has elapsed since a reference point in time:

- In one example, the terminal is considered that it may not have a valid timing advance and frequency compensation if it has not been scheduled on the downlink for a time interval exceeding a certain time, $T_{1(1)}$.
- In one example, the terminal is considered that it may not have a valid timing advance and frequency compensation if it has not been scheduled on the uplink for a time interval exceeding a certain time, $T_{1(2)}$.
- In one example, the terminal is considered that it may not have a valid timing advance and frequency compensation if it has not been sent a timing advance or frequency compensation command for a time interval exceeding a certain time, $T_{1(3)}$. It is noteworthy that the eNB might send TA and/or frequency compensation commands to the terminal as a part of conventional operations. In this case, the $T_{1(3)}$ timer would reset when these TA and/or frequency compensation commands are sent from the eNB to the terminal.
- In one example, the terminal is considered as not having a valid timing advance and frequency compensation if it has not acquired GNSS position for a time interval exceeding a certain time, $T_{1(4)}$. The terminal will know when it acquires GNSS position and can thus determine when it last performed a positioning procedure. Depending on the implementation choices, the base station may in some cases know when the terminal acquires GNSS position. This can for example be implicitly (e.g. if and when there are known conditions that imply that the terminal was expected to acquire GNSS position) and/or explicitly (e.g. if and when the terminal signals to the terminal when it last acquired GNSS position).

Figure 9:
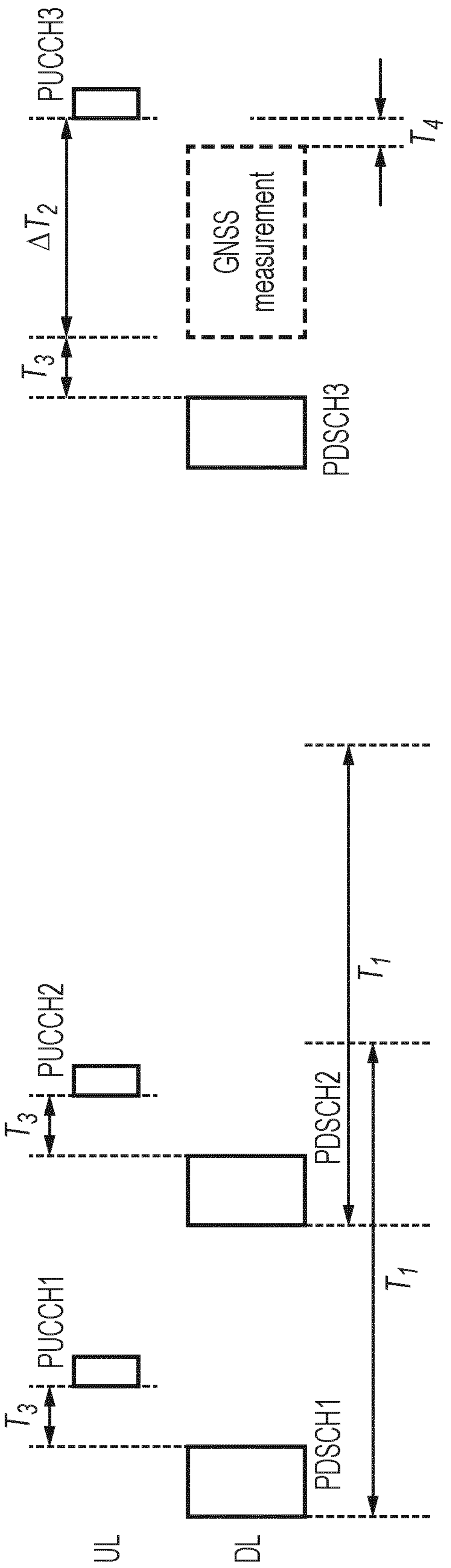
FIG. 9 illustrates another example of communications and GNSS activity in an NTN example.

FIG. 9 illustrates an example implementation in accordance with this example and with the use of a timer $T_{1(1)}$ for determining whether the terminal is expected to have valid synchronisation information.

In this example, the terminal is allocated a PDSCH, PDSCH1, and associated PUCCH, PUCCH1, is transmitted after a time delay of $T_3$ after its associated PDSCH. This can for example be in accordance with a legacy mode of operation where the uplink resources are found after a predetermined time or number of timer period(s) has elapsed.

Then, and before a time $T_1$ has elapsed, the terminal is scheduled another PDSCH, namely PDSCH2. Since this PDSCH is scheduled within a time $T_1$ from the previous PDSCH, the corresponding PUCCH, PUCCH2, is transmitted after the delay of $T_3$.

At the next PDSCH, namely PDSCH3 in FIG. 9, the PDSCH is scheduled to the terminal after a time greater than $T_1$. Since there is this longer gap between PDSCH allocations to the terminal and the gap is longer than $T_1$, it is assumed that the terminal may not have an accurate GNSS measurement (from which to derive timing advance and frequency compensation) and/or TA and frequency compensation information. Accordingly, the PUCCH, PUCCH3, that is associated with PDSCH3 is delayed by a time $\Delta T_2$ compared to other PUCCHs. This time is sufficient to allow the terminal to perform a GNSS measurement, such that it can determine the timing advance and frequency compensation to apply to the PUCCH (this determination can occur in the time duration labelled $T_4$).

From one perspective, adding a delay $\Delta T_2$ can also be seen as using a different scheduling interval depending on whether the terminal is expected to carry out a positioning measurement procedure or not. For example, when it is not expected to perform the procedure, an interval $T_3$ is used and when it is expected to perform the procedure, a longer interval $T_2$ is used (with for example $T_2=T_3+\Delta T_2$). It will become clear below that the two views and examples are considered in the present disclosure.

Figure 10:
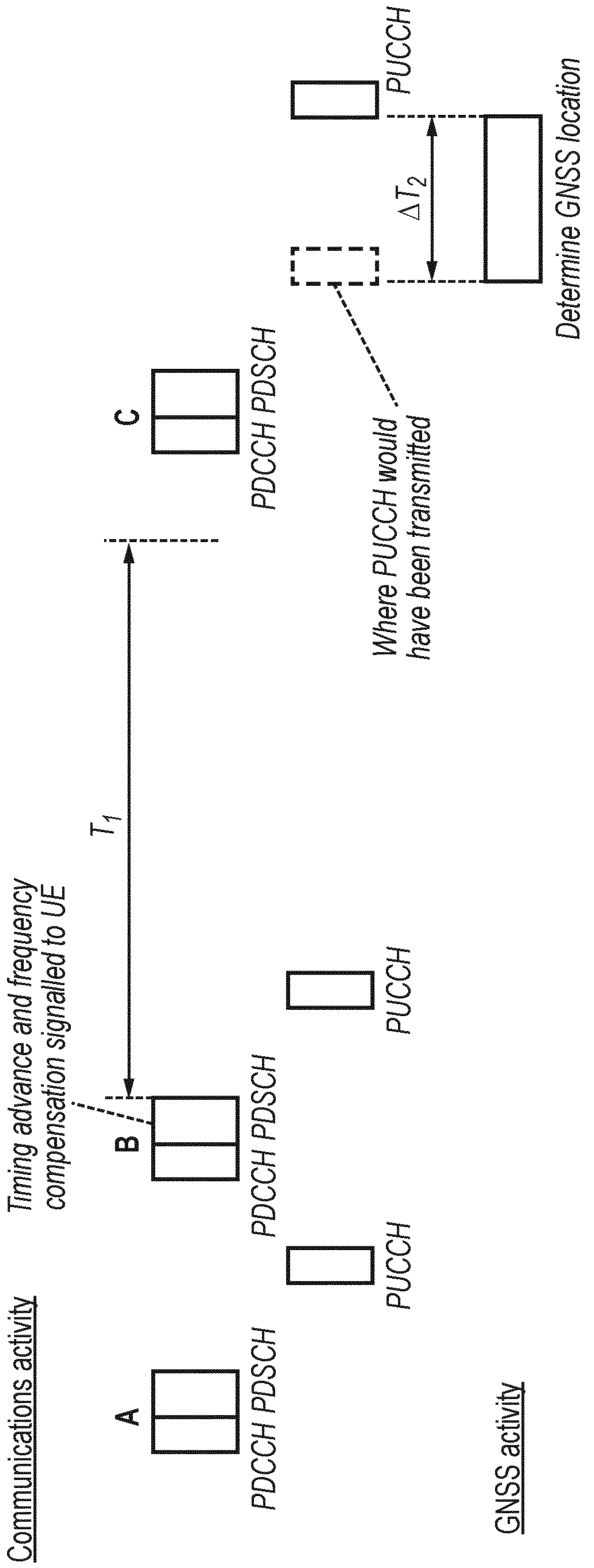
FIG. 10 illustrates an example use of a timer for managing positioning procedures and transmissions.

FIG. 10 illustrates the use of a timer $T_1$ (in this case $T_{1(3)}$) for managing positioning procedures. In this example use case, three time periods or time regions are illustrated, where the terminal is allocated resources in the downlink: A, B, C. In time period A, it is assumed that the terminal has valid timing advance/frequency compensation. In response to and based on the PUCCH of time period A, the base station determines timing advance and/or frequency information and transmits the information to the terminal in time period B.

Hence, the terminal is expected to have valid TA and frequency compensation information, or more generally, up to date synchronisation information and does not need to determine GNSS location for transmitting the PUCCH in time region B.

After B, the terminal is not scheduled for a time longer than $T_1$ (in this case $T_{1(1)}$ as the timer is based on when the TA and frequency compensation information was last received). The timing advance and frequency compensation information is then expected or assumed to be out of date when the terminal is scheduled in time region C. As the TA and frequency compensation information is out of date, the terminal has to determine GNSS location and the PUCCH is delayed for a time $\Delta T_2$ to allow the terminal to determine GNSS location.

Although the examples above and FIG. 9 discuss a single timer, it will appreciated that two or more timers may also be used. For example and using the example timers (or predetermined thresholds) discussed above, a system may implement two or more of timers $T_{1(1)}$ to $T_{1(4)}$ and the information may be assumed to be valid as long as at least one of the timers has not expired or one of the thresholds has not been reached. On other hand, if all timers have expired or if all thresholds have been exceeded, then the synchronisation will be assumed invalid or out of date and the terminal will be expected to carry out a positioning procedure in order to obtain up to date or valid synchronisation information.

In some cases, the terminal's speed or velocity may be taken into account when determining whether the terminal is considered as having or not having a valid timing advance and frequency compensation. For example, if a terminal is known to be fast moving, a shorter value for the time interval $T_1$ (as discussed above) can be used.

The duration of timer or time interval $T_1$ may be determined in any appropriate manner, so long as the terminal and base station use the same configuration. For example using one or more of the following techniques—which may be applied to the timer as such or to a configuration or parameter for the time interval:

- The interval $T_1$ is predetermined (e.g. defined in a standard document).
- The interval $T_1$ is configured by the base station using signalling. The signalling could be unicast, e.g. RRC CONNECTED mode signalling, or it could be broadcast, e.g. via SIB signalling.

The duration of timer or time interval $\Delta T_2$ (to allow for GNSS measurements to be performed) may be determined in any appropriate manner, so long as the terminal and base station use the same configuration. For example using one or more of the following techniques—which may be applied to the timer as such or to a configuration or parameter for the time interval:

- The delay, $\Delta T_2$, is predetermined (e.g. defined in a standard document).
- The delay, $\Delta T_2$, is configured by the base station using SIB signalling or RRC unicast signalling.
- The terminal can signal to the terminal its capability in terms of $\Delta T_2$. If the terminal is able to acquire GNSS position quickly, the terminal can signal a lower value of $\Delta T_2$. If the terminal takes a longer time to acquire GNSS position, the terminal can signal a higher value of $\Delta T_2$.
- The base station can then signal the $\Delta T_2$ value that the terminal should apply. The value signalled by the base station could be greater than or equal to the value signalled by the terminal as a capability. In some cases, the eNB may refuse an RRC connection request from the terminal if the terminal's reported capability value is greater than a value that the network wishes to tolerate. In this case, the terminal may have to use different techniques and may for example have to perform GNSS measurement prior to each DRX ON cycle (see FIG. 7 and its discussion) if it wishes to use this base station.
- The terminal can signal its preferred value of $\Delta T_2$ as terminal assistance information. The terminal could be able to determine its position using different techniques that may have different impacts. For example, the terminal could continually monitor GNSS, such that the terminal is in "warm start" mode when it acquires GNSS. This mode may be more power-hungry than a "cold start" mode where the terminal only monitors GNSS when it actually needs to acquire a GNSS position. The terminal could then signal an appropriate preferred value of $\Delta T_2$ depending on whether the terminal prioritizes power consumption control or saving (with for example a higher value of $\Delta T_2$ which would be signalled, allowing for "cold start" GNSS operation) or a lower latency operation (a lower value of $\Delta T_2$ would be signalled, allowing for lower latency access to the channel). The base station could then signal to the terminal which value of $\Delta T_2$ to apply, taking into account the terminal assistance information that the terminal had previously signalled).
  - The terminal could signal via terminal assistance information that it does not need a GNSS measurement gap. This would be expected in cases where the terminal is expected to have its location available without having to perform a positioning measurement procedure, for example based on one or more of the following reasons:
    - The terminal is stationary. In this case, the terminal knows its location (either from an initial GNSS measurement or from configuration information: at device set-up, the terminal can be programmed with its location) and knows that the location will not change.
    - The terminal knows its location by other means (e.g. a terminal on a train may know where it is from inertial measurements and/or update as it passes signals).
    - The terminal does not need a gap as it is expected to always have up-to-date information using other means, e.g. by reading GNSS before DRX_ON at every cycle.
    - The terminal does not need a gap as the terminal has a tracking application and has GNSS side information in any case.

Before looking at the next step, it is noteworthy that in many cases, current systems have pre-agreed procedures for determining the location of an uplink transmission associated with a downlink transmission. For example for eMTC, there is a fixed time offset between a downlink transmission (e.g. PDSCH) and a corresponding or associated uplink transmission (e.g. PUCCH for the acknowledgement transmission), namely 4 subframes. For NB-IoT, a limited number of time offsets between PDSCH and PUCCH can be signalled via Downlink Control Information (DCI). In NR, the time offset between PDSCH and PUCCH is signalled in a "PDSCH-to-HARQ_feedback timing indicator" field within the DCI.

Once the terminal has identified the $\Delta T_2$ value to be used, it can determine the actual time at which to transmit the uplink transmission PUCCH

- The additional delay, $\Delta T_2$, is added to the delay that would otherwise be applied (e.g. if no position measurement would have to be performed).
- For eMTC, the time at which PUCCH is transmitted relative to PDSCH is equal to the sum of (1) the specified PDSCH to PUCCH delay and (2) the $\Delta T_2$ value. As mentioned above, for eMTC, the default specified PDSCH to PUCCH delay is 4 subframes. However other delays between PDSCH and PUCCH could be used in some systems (for example in a satellite network) and in such cases, the $\Delta T_2$ value would be added to such delays.
- For NB-IoT, the time at which PUCCH is transmitted relative to PDSCH is equal to the sum of (1) the time offset between PDSCH and PUCCH signalled via DCI and (2) the $\Delta T_2$ value.
- For NR, the time at which PUCCH is transmitted relative to PDSCH is equal to the sum of (1) the "PDSCH-to-HARQ_feedback timing indicator" field indicated within the DCI and (2) the $\Delta T_2$ value.

In cases where the synchronisation information is believed to be up to date and where position measurement would not be expected to be performed, the terminal can revert to the legacy or conventional operating mode, using the gap as provided by eMTC, NB-IoT, NR, etc.

In some cases, rather than defining the timing of the uplink transmission using a delay value $\Delta T_2$ and expecting the terminal and base station to both know whether the delay will be used, the base station may signal whether the transmission is delayed or not, or even the time at which the uplink transmission is scheduled in some cases.

For example, instead of the terminal determining a $\Delta T_2$ value and adding it to an otherwise determined (e.g. predetermined or configured) time delay between PDSCH and PUCCH, the base station may just signal a value of the delay between PDSCH and PUCCH that is to be applied. For example, if the base station considers that the terminal may not have a recently updated GNSS position, the base station can signal a longer value of delay between PDSCH and PUCCH than would be the case when the terminal did have an updated GNSS position.

This can provide the benefit that the terminal and the base station do not have to have a pre-agreed understanding of when delay will be used and when delays won't be used (as in some examples above) as the terminal will follow the guidance provided by the base station which is expected to already take this aspect into account.

For example, one or more techniques may be applied including:

- Signalling a bit within the DCI to indicate whether the terminal should apply an extended PDSCH-PUCCH gap or not.
  - For eMTC, a single bit in the DCI indicates whether (1) the terminal applies a delay of 4 subframes between PDSCH and PUCCH; or (2) the terminal applies a delay of 4+$\Delta T_2$ subframes between PDSCH and PUCCH.
  - For NB-IoT, a single bit in the DCI indicates whether (1) the terminal applies the legacy value of "Time offset value" indicated via the HARQ-ACK resource field (i.e. the PUCCH resource); or (2) the terminal applies a different (longer) value of "Time offset value" indicated via the HARQ-ACK resource field, where this longer time accounts for the $\Delta T_2$ value.
  - For NR, a bit indicates whether the "PDSCH-to-HARQ_feedback timing indicator" field should be interpreted (1) as per legacy procedures; or (2) as a separate mapping between bit fields within the "PDSCH-to-HARQ_feedback timing indicator" field and actual PDSCH→PUSCH delays that account for the $\Delta T_2$ value. In this case, a new mapping can be provided which uses the same index as the legacy index and which indicates both the legacy delay and the extended delay.
  - For NR, the "PDSCH-to-HARQ_feedback timing indicator" field points to an index of a table indicating the PDSCH to PUCCH delay known as $K_1$. One or more of these entries has a delay of at least $T_2=T_3+\Delta T_2$. Such entries may be used when a longer delay is required. This embodiment avoids the need to introduce a new field in the DCI and reuses the existing $K_1$ table which simplifies its integration in existing and legacy systems.

In some examples, the uplink transmission (e.g. PUCCH) is transmitted in a future DRX_ON cycle or duration. For example:

- The uplink transmission may be transmitted in the following DRX_ON duration.
- Signalling from the base station (e.g. RRC signalling) indicates by how many DRX cycles that the terminal should delay its PUCCH when it needs to perform a GNSS measurement. The terminal then delays its PUCCH transmission based on the indicated number of DRX cycles.
- The delay, $\Delta T_2$, is determined according to one of the previous examples and the terminal then calculates the number of DRX cycles by which it should delay its PUCCH transmission based on the resulting delay.

It should be noted that the terminal does not really need to wait for a future DRX cycle in order to transmit its uplink transmission (e.g. PUCCH). While it is usually expected to be able to transmit the uplink transmission (e.g. PUCCH transmissions) in the uplink at any time, regardless of the terminal being in DRX_ON or DRX_OFF mode, there may be scheduler and/or implementation advantages to having a terminal only transmitting during its DRX_ON durations. For example, the terminal is expected to be make a more efficient use of processing and power resources if transmitting the uplink transmission when it is active in the downlink. This is because the terminal would otherwise have to power up while it is otherwise inactive (DRX_OFF) for sending the uplink transmission, power down again and power up again for the next DRX_ON period. In such a case, the use of power resources is expected to be less efficient compared to transmitting or sending the uplink transmission when the terminal is already powered up in a DRX_ON period.

In some cases, the base station may schedule a late uplink transmission for the terminal (in order to accommodate position measurements) based on a re-scheduling of an uplink transmission if the terminal did not have accurate measurements and/or synchronisation information when attempting to transmit the previous uplink transmission.

For example, a terminal without recent GNSS measurements can send PUCCH via a re-transmission. For example, the base station schedules a downlink transmission (e.g. PDSCH) and an associated uplink transmission (e.g. PUCCH) without including an additional delay for, or without taking into account of, a gap needed for position measurements. For example, it may use legacy procedures. If the terminal has recently obtained a GNSS measurement, it can send HARQ ACK/NACK feedback using this PUCCH. However, if the terminal has not recently obtained a GNSS measurement, it does not transmit using the PUCCH resources. As the timing advance and/or frequency compensation applied to the PUCCH would be expected to be incorrect, the missing transmission is expected to have a limited impact. The terminal can however make measurements in order to update its GNSS information.

In this case, when the base station does not receive a PUCCH in the resources originally scheduled for the acknowledgement feedback, it can assume that the terminal had not read GNSS. It may then implement one or more techniques:

- It can send a DCI that just allocates PUCCH for transmitting the HARQ ACK/NACK. It should be noted that in legacy eMTC or NB-IoT system, a PUCCH is always associated with a PDSCH. Accordingly, using a DCI to allocate only a PUCCH, without a PDSCH would be significant departure from current systems. This would have signalling benefits but it would also imply a substantial change to legacy functionality and the implementations of the system.
  - The DCI can indicate the HARQ process to which the allocated PUCCH relates. The terminal can then identify which information to send on the uplink.
  - In some cases, the allocated PUCCH is always assumed to relate to the previously scheduled PDSCH. This technique may also be used by the terminal to identify which uplink information to transmit
- It can send a PDCCH that allocates PDSCH and PUCCH. In this case, the base station can then not toggle the New Data Indicator (NDI) and the terminal can provide the acknowledgement feedback in the PUCCH. Using legacy operations, the allocated PDSCH may be for a re-transmission and may relate to the same transport block as the initial transmission. The initial transmission may have been sent with a large number of repetitions (this is often expected due to the relatively larger pathloss between the satellite and terminal in an NTN system compared to a terrestrial system). In order to save PDSCH resource for the re-transmission, the PDSCH can be allocated with a much-reduced number of re-transmissions. For example, if the initial transmission had been scheduled with 256 repetitions, the re-transmitted PDSCH could be scheduled with 1 repetition, or 16 repetitions, as the PDSCH re-transmission is not provided for the purpose of increasing the decoding probability of the PDSCH. It is instead provided for allocating a second later PUCCH to allow the terminal to feedback the ACK/NACK status on the initially transmitted PDSCH.
- When the terminal does not transmit a PUCCH (e.g. PUCCH1) because it does not have an up to date GNSS measurement, the terminal can indicate in a subsequent PUCCH (e.g. PUCCH2)—or in other appropriate uplink signalling—that it did not attempt to transmit PUCCH1. It may be helpful for the base station to be aware of this and to identify that this was not caused by an unsuccessful decoding attempt. For example, the base station may use this information to:
  - Apply rate control to the PDCCH. If the base station does not receive a PUCCH, it might otherwise believe that this is evidence that the terminal had not received the PDCCH (that carried the DCI scheduling the PUCCH). In this case, the base station might increase the aggregation level or number of repetitions applied to the PDCCH. By receiving an indication that the terminal did not transmit PUCCH1, the base station PDCCH rate control function would not incorrectly change the aggregation level/number of repetitions for PDCCH thinking that the terminal had not received the PDCCH.
  - Apply power control to the PUCCH. If the base station knows that PUCCH1 had never been transmitted by the terminal, the base station would not attempt to increase the terminal's PUCCH transmit power. In current systems, if a PUCCH is not received by the base station, the base station would typically be expected to increase the transmit power or number of repetitions applied to PUCCH in order to maintain the reliability of the PUCCH. This would however be inefficient if the PUCCH was never transmitted in the first place, rather than transmitted but not received.
- Similarly, the subsequent PUCCH (e.g. PUCCH2) may indicate whether the terminal received the initial PDCCH (that carried the DCI scheduling PDSCH1 and PUCCH1). This can help the base station when applying rate control to the PDCCH (e.g. to choose the aggregation level for the PDCCH or the number of repetitions to apply to the PDCCH).
- Likewise, the subsequent PUCCH (e.g. PUCCH2) may indicate whether the terminal correctly received the PDSCH1 or not. This indication may be in addition to an indication of whether the terminal correctly received the re-transmitted PDSCH, PDSCH2, or not. This indication may be helpful in allowing the base station to correctly rate control the PDSCH (by choosing appropriate MCS values/numbers of repetitions). Conventionally, if PDSCH2 had been transmitted after the base station did not receive an ACK for PDSCH1, this would indicate that PDSCH1 was not successfully received by the terminal. It will however be appreciated that in the present case, this may be caused by the terminal being unable to send the uplink acknowledgement for PDSCH1, rather than the terminal being unable to decode PDSCH1. The base station may consider this when selecting an appropriate configuration for communicating with the terminal.
- When the terminal does not transmit the PUCCH (PUCCH1), due to the need for making a GNSS measurement, it can pause one or more timers until after it has made the GNSS measurement. For example, it will be appreciated that the terminal can run timers to control its operation, for example to determine when it should move to a lower power state (e.g. there is an inactivity timer in DRX mode that allows the terminal to move to a lower power state once the inactivity timer has expired). By pausing these timers, the terminal can prevent an inadvertent or unintentional "time out" and move to a lower power state when there is still active data for the terminal. This is to appreciate that the terminal is pausing an uplink transmission pending the positioning procedure, rather that the terminal no longer having upcoming transmissions.

The examples above discuss various examples of how a gap between a downlink transmission (e.g. PDSCH) and an uplink transmission (e.g. PUCCH) can be created to allow the terminal time to make a GNSS measurement in order to calculate the timing advance/frequency compensation to apply to the PUCCH.

It will be appreciated that different locations may be used for the gap, to allow the terminal to make a GNSS measurement. For example:

The gap may be inserted between the PDCCH that carries the downlink grant (e.g. DCI) and the associated PDSCH. This can for example allow the legacy PDSCH to PUCCH timing to be applied or re-used: the terminal can make its GNSS measurement in the time between the PDCCH and PDSCH such that it is then in a position to transmit the PUCCH and extra time between PDSCH and PUCCH is unlikely to be required.

The gap may be inserted between a PDCCH carrying an uplink grant in a DCI and the associated PUSCH.

The GNSS measurement gap may be located within the Uplink Compensation Gap (UCG). The Uplink Compensation Gap has been specified in respect of HD-FDD eMTC and NB-IoT devices. It is designed to allow the terminal to obtain synchronisation during a long sequence of uplink repetitions. Although the terminal would have already obtained GNSS measurement prior to the start of an uplink transmission, the terminal may have moved whilst transmitting its uplink repetitions and so it may be helpful for the terminal to update its location thereby reading the GNSS during one or more of these Uplink Compensation Gaps. It should be noted that an uplink transmission may be interrupted by multiple UCGs.

The duration of the UCG(s) may be increased to provide additional time for the UE to perform GNSS measurements. Such an increase may be applied to all of or only a subset of UCGs in a period in which the terminal is expected to make measurements.

In legacy systems, the PDCCH monitoring may be controlled by a Wake Up Signal (WUS). Prior to a PDCCH monitoring occasion, where the PDCCH monitoring occasion could be the DRX_ON duration of the DRX cycle, a WUS signal indicates to the terminal whether it should wake up to monitor PDCCH or whether it can go to a lower power sleep state. Techniques of the present invention may be used which use a signal such as a wake up signal. Although the following examples are presented using the example of WUS, it will be appreciated that the same teachings can be applied equally to other signals and are not limited to the particular use of WUS signals.

In one implementation, a WUS signalling indicates whether the terminal should make a GNSS measurement prior to the PDCCH monitoring occasion, e.g. prior to the next DRX_ON period. If the WUS indicates that the terminal should make a GNSS measurement, the terminal delays monitoring PDCCH (and the base station delays transmitting PDCCH) by a time that is sufficient to allow the terminal to make a GNSS measurement.

In one example, if the terminal determines that it would need to make a GNSS measurement prior to transmission in the uplink, e.g. according to one of the examples above or using any appropriate method, it can monitor WUS signalling at an earlier time compared to cases where no GNSS measurements are required (the latter may for example use existing or legacy timing). In such a case, there would be two potential locations for the WUS:

A first WUS location may correspond to a legacy WUS location, which is close to the PDCCH monitoring occasion.

A second WUS location which is deemed sufficiently early relative to the PDCCH monitoring occasion to allow the terminal to make a GNSS measurement between the second WUS location and the PDCCH monitoring occasion.

The terminal may then choose whether to monitor WUS at the first WUS location or at the second WUS location depending on whether it estimates that its positioning and/or synchronisation information is up to date or not.

In some cases, rather than relying on a gap between PDCCH and a scheduled PUCCH, where the gap allows the terminal to make a GNSS measurement, the terminal can initiate an access procedure (hereinafter "RACH") or send an initial access message (e.g. "PRACH") once it has made the GNSS measurement. The terminal can then notify the base station that it has completed the relevant positioning procedure. This technique may be used with measurements triggered by the WUS signalling or by the PDCCH (e.g. by the PDCCH carrying a DCI scheduling an uplink transmission).

In one example, the terminal can receive a PDCCH indicating a downlink (PDSCH) transmission to the terminal, where the downlink transmission is associated with a PUCCH in order to carry acknowledgement (ACK/NACK) information. The terminal can initiate an access procedure and send an initial access message (e.g. a PRACH) once it has made the GNSS measurement. In some examples, the initial access message (e.g. a PRACH) can indicate the ACK/NACK status of the PDSCH or it can signal to the base station that the terminal is ready to communicate on the uplink. The latter can for example be used as an indication that the terminal is ready to receive further signalling to which it can respond immediately, without further gaps for GNSS measurement purposes.

In some implementations, the terminal can receive a WUS that indicates that the terminal should make a GNSS measurement and send an initial access message (e.g. a PRACH) to the base station once the measurement is complete—or that indicates that the terminal should make a GNSS measurement where the terminal is configured to initiate a RACH procedure and send an initial access message (e.g. a PRACH) to the base station once the measurement is complete (without an explicit prompt to do so). Once the terminal has sent the initial access message (e.g. a PRACH), the base station can schedule the terminal without gaps for GNSS measurement.

In either case, the terminal may also be given dedicated PRACH resources with which to respond to the base station. By assigning dedicated PRACH resources to the terminal, the base station will know which terminal is responding and will be able to schedule PDCCH/PDSCH directly to the terminal without having to execute further steps within the RACH procedure. This is to appreciate that the terminal is using the access procedure to notify the base station, after a downlink transmission from the base station, and is expected by the base station, rather than an unexpected access request.

The teachings and techniques discussed herein apply equally to Semi-Persistent Scheduling (SPS) or Preconfigured Uplink Resources (PUR), if used.

While the above examples have focused on cases where a gap for GNSS measurement is used prior to a PUCCH transmission, in some cases, feedback signalling may be transmitted using uplink SPS resources. In such cases, there may be a delay in transmitting the feedback signalling on the SPS resources while the terminal is performing a GNSS measurement.

Accordingly, a terminal to which uplink SPS resources have been configured may be unable to respond immediately to the base station due to the time it will take to obtain its current GNSS location. When such a terminal later does respond to the base station using the allocated SPS resources, it can include a reason why it did not respond earlier. As mentioned above regarding for example rescheduled downlink transmissions, this can allow the base station to improve the accuracy and relevance of its internal control loops, such as PDCCH aggregation level control loop; and/or the control loop controlling the number of repetitions applied; etc. For example, the base station can ignore what would otherwise have been classed as an "error" from the terminal arising from not receiving a transmission from the terminal as expected.

Figure 11:
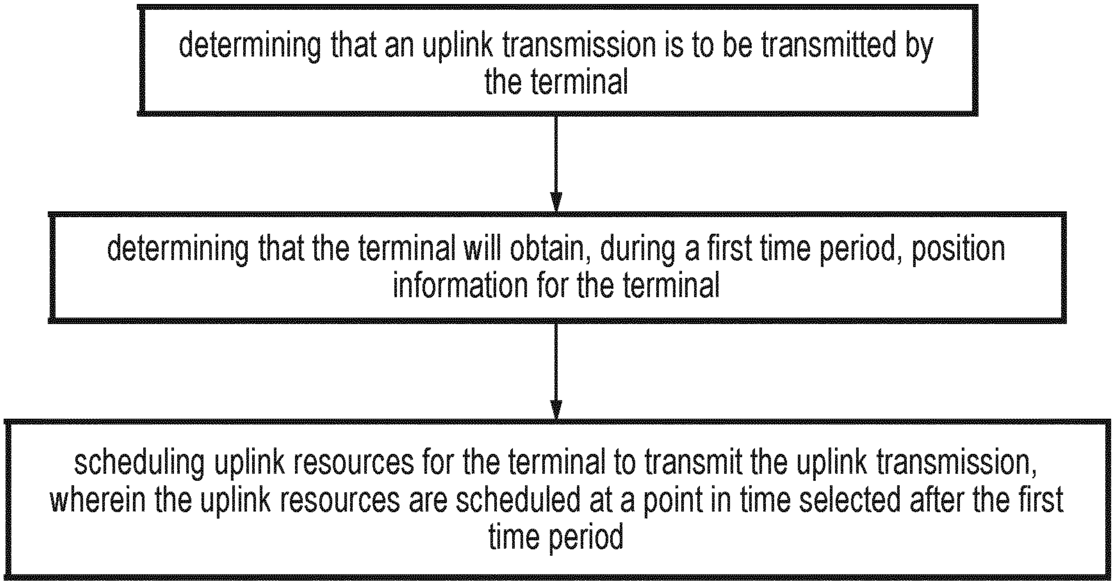
FIG. 11 provides an example method of operating a base station.

FIG. 11 provides an example method of operating a base station in a mobile telecommunications system comprising a Non-Terrestrial Network "NTN". The method comprises determining that an uplink transmission is to be transmitted by the terminal. This may for example be based on determining that a downlink transmission is to be sent to the terminal, the downlink transmission being associated with a corresponding uplink transmission (e.g. to send acknowledgment information for the downlink transmission).

The base station can also determine that the terminal will obtain, during a first time period, position information for the terminal. This determining step may be carried out before, after or at least partially during the previous determining step.

The base station can then schedule uplink resources for the terminal to transmit the uplink transmission, where the uplink resources are scheduled at a point in time selected after the first time period. Accordingly, the base station can adjust its scheduling based on the identification that the terminal will be required to acquire position information and can schedule the uplink transmission after position measurements for the terminal.

In some cases, a downlink transmission is transmitted to the terminal (e.g. a DCI), wherein the uplink transmission is associated with the downlink transmission. A delay indication may be transmitted to the terminal, the delay indication identifying the selected point in time for sending the uplink transmission. This delay indication may be an absolute indicator (e.g. identifying a specific point in time which may be a particular resource, a sub-frame, a DRX cycle, etc.) or may be provided as an relative indicator (e.g. identifying a delay in terms of resource, a sub-frame, a DRX cycle, etc. relative to an expected—non-delayed—corresponding time or time period). In some cases:

- downlink control information may be sent which identifies downlink resources for the downlink transmission (e.g. PDSCH), where the downlink control information is associated with default uplink resources for the associated uplink transmission and the downlink control information can comprise the delay indication. In this case, the delay indication can identify the selected point in time by identifying a delay relative to the default uplink resources.
- For example, the downlink control information may be associated with the downlink transmission where the default uplink resources are defined relative to the downlink transmission. In such cases, the downlink control information can be considered as being indirectly associated with the default uplink transmission and/or default uplink resources.
- the delay indication can identify one or more of a time period; a number of one or more sub-frames; and a number of one or more DRX cycles.
- As discussed above it will be appreciated that in some case, the first period (for the measurements) may be before the downlink transmission (e.g. PDSCH) and in other cases, it may be after the downlink transmission.

In some cases, it can be determined that the terminal has not transmitted a first uplink transmission in uplink resources allocated for the first uplink transmission and upon determining that the terminal has not transmitted the first uplink transmission, determining that the uplink transmission is to be transmitted by the terminal. A notification identifying the uplink resources can be transmitted to the terminal. In some cases, the notification can comprise an uplink grant for the uplink transmission, in some cases it can comprise a downlink grant for a downlink transmission (e.g. repeated or delayed from a previous one) which is associated with corresponding uplink resources.

In some cases, a wake-up signal may be transmitted for the terminal at a first point in time, the first point in time being before the first time period. Accordingly, the terminal can be woken up and given time (the first time period) to make measurements before the uplink transmission is scheduled after the first time period.

In some cases, upon determining that the terminal has transmitted an initial access message (e.g. a PRACH), the uplink resources for the terminal to transmit the uplink transmission are scheduled. The access procedure can be initiated by the terminal once the position information and/or synchronisation information has been obtained and the first time period has thus expired already.

In some cases, it can be determined that the terminal will obtain, during a first time period, position information for the terminal, based on one or more of: a time elapsed since the terminal last communicated on the uplink; a time elapsed since the terminal last received communications on the downlink; a time elapsed since the base station last sent timing and frequency information to the terminal; and a time elapsed since the terminal last obtained position information.

Figure 12:
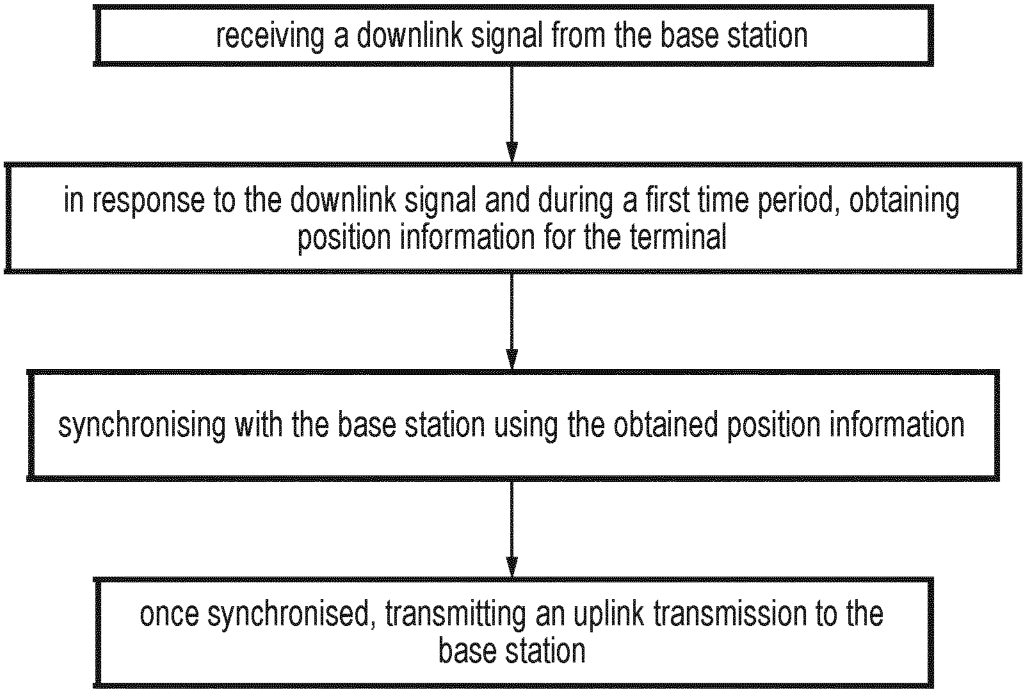
FIG. 12 provides an example method of operating a terminal.

FIG. 12 provides an example method of operating a terminal in a mobile telecommunications system comprising a Non-Terrestrial Network "NTN". The method comprises receiving a downlink signal from the base station.

In response to the downlink signal and during a first time period, the terminal obtains position information for the terminal, e.g. GNSS information or any other appropriate location or position information. The terminal can synchronise with the base station using the obtained position information, for example to calculate timing (e.g. timing advance) and frequency (e.g. frequency compensation) information. Once synchronised, the terminal can transmit an uplink transmission to the base station.

In some cases, the downlink signal comprises one or more of:

- downlink control information (e.g. DCI) associated with a downlink transmission;
- downlink control information associated with a downlink transmission and identifying a delay associated with a position information procedure (e.g. a relative delay $\Delta T_2$ or an absolute delay $T_2$);
- a wake-up signal; and
- a wake-up signal associated with a position information procedure (e.g. if two wake up signals are provided with one being associated with a position information procedure and one not being associated with a position information procedure).

In some cases, the downlink signal comprises downlink control information associated with a downlink transmission (e.g. PDSCH1), the downlink transmission being associated with the uplink transmission (e.g. ack/nack information for PDSCH1) and with corresponding first uplink resources (e.g. PUCCH1). The method may then further comprise determining that the first uplink resources are provided in a second time period which is during or before the first time period. The terminal will then obtain the position information and will disregard the first uplink resources. The terminal will receive a second downlink signal identifying second uplink resources provided in a third time period after the first time period. The second downlink signal will sometimes be associated with only the uplink resources (e.g. PUCCH2) and in other cases it will associated with downlink resources (e.g. PDSCH2) and with the corresponding uplink resources (PUCCH2). This may be caused by the base station determining that no transmission was sent in the first uplink resources, by the terminal transmitting an initial access message or initiating an access procedure or using any other suitable means. The terminal can then transmit the uplink transmission using the second uplink resources (after the first period).

In some cases, upon synchronising with the base station, the terminal performs an access procedure with the base station. The terminal can receive a second downlink signal identifying uplink resources for the uplink transmission. As mentioned above, the second downlink signal will sometimes be associated with only the uplink resources (e.g. PUCCH2) and in other cases it will associated with downlink resources (e.g. PDSCH2) and with the corresponding uplink resources (PUCCH2). The terminal may then transmit the uplink transmission to the base station using the identified uplink resources.

The term resource set, resources or resource can refer to any suitable set of time and frequency resources to be used to transmit signals on the wireless interface. This may be measured in some cases based on a unit of resource block, sub-slot, slot, subframe, frame or any other resource (time and/or frequency) unit deemed appropriate.

Accordingly, using teachings and techniques of the present invention, the power consumption associated with terminals having to synchronise with an NTN before sending an uplink transmission can be better controlled.

Teachings and techniques of the present disclosure provide a method for use in a mobile telecommunications system comprising a Non-Terrestrial Network "NTN", the network comprising a base station and a terminal configured to communicate with the base station via an air interface provided by infrastructure equipment of the NTN. The method comprises the terminal receiving a downlink signal from the base station; determining that a first uplink transmission is to be transmitted by the terminal; determining that the terminal will obtain, during a first time period, position information for the terminal; the base station scheduling first uplink resources for the terminal to transmit the first uplink transmission, wherein the first uplink resources are scheduled at a point in time selected after the first time period; in response to the downlink signal and during the first time period, the terminal obtaining position information for the terminal; and the terminal transmitting, using the obtained position information, the first uplink transmission to the base station using the first uplink resources.

It will be appreciated that while the present disclosure has been provided in the context of current systems and terminology, it is not limited to these particular examples. For examples, any reference to a PDSCH may be understood as a reference to an downlink transmission. References to a PUCCH or PUSCH may be understood as an uplink transmission and a PUCCH can often be considered as a transmission of acknowledgment feedback for a downlink transmission.

Likewise, references to GNSS may be understood as references to a positioning system and GNSS information as location or position information. DCI may be understood as downlink control information, e.g. comprising a downlink and/or uplink grant and sometimes also including configuration information for the corresponding scheduled downlink and/or uplink transmission(s).

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example, transmitting a message may involve using several resource elements in an LTE or NR environment such that several signals at a lower layer correspond to a single message at a higher layer. Also, transmissions from one node to another may relate to the transmission of any one or more of user data, system information, control signalling and any other type of information to be transmitted. It will also be appreciated that some information may be notified or indicated implicitly rather than through the use of an explicit indicator.

Also, whenever an aspect is disclosed in respect of an apparatus or system, the teachings are also disclosed for the corresponding method and for the corresponding computer program. Likewise, whenever an aspect is disclosed in respect of a method, the teachings are also disclosed for any suitable corresponding apparatus or system as well as for the corresponding computer program. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example, any one or more of a mobile node or network node may be configured accordingly if appropriate, so long as it is technically feasible and not explicitly excluded.

Whenever the expressions "greater than" or "smaller than" or equivalent are used herein, it is intended that they disclose both alternatives "and equal to" and "and not equal to" unless one alternative is expressly excluded.

It will be appreciated that while the present disclosure has in some respects focused on implementations in an LTE network as such a network is expected to provide the primary use case at present, the same teachings and principles can also be applied to other wireless telecommunications systems. Thus, even though the terminology used herein is generally the same or similar to that of the LTE (or 5G) standards, the teachings are not limited to the present versions of LTE (or 5G) and could apply equally to any appropriate arrangement not based on 5G/LTE, for example any arrangement possibly compliant with any future version of an LTE, 5G or other standards—defined by the 3GPP standardisation groups or by other groups. Accordingly, the teaching provided herein using 3GPP, LTE and/or 5G/NR terminology can be equally applied to other systems with reference to the corresponding functions.

It will be appreciated that the principles described herein are applicable not only to certain types of communications device, but can be applied more generally in respect of any types of communications device. For example, while the techniques are expected to be particularly useful for NTN systems, the skilled person will appreciate that they can also be applied to other systems which for example face similar challenges and which are expected to benefit in a similar manner.

It is noteworthy that where a "predetermined" element is mentioned, it will be appreciated that this can include for example a configurable element, wherein the configuration can be done by any combination of a manual configuration by a user or administrator or a transmitted communication, for example from the network or from a service provider (e.g. a device manufacturer, an OS provider, etc.).

Techniques discussed herein can be implemented using a computer program product, comprising for example computer-readable instructions stored on a computer readable medium which can be executed by a computer, for carrying out a method according to the present disclosure. Such a computer readable medium may be a non-transitory computer-readable storage medium with an executable program stored thereon, wherein the program instructs a microprocessor to perform said method. Additionally, or alternatively, the techniques discussed herein may be realised at least in part by a computer readable communication medium that carries or communicates code in the form of instructions or data structures and that can be accessed, read, and/or executed by a computer.

In other words, any suitable computer readable medium may be used, which comprises instructions and which can for example be a transitory medium, such as a communication medium, or a non-transitory medium, such as a storage medium. Accordingly, a computer program product may be a non-transitory computer program product.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely examples of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Further examples of the present disclosure are set out in the following numbered clauses:

Clause 1. A method of operating a base station in a mobile telecommunications system comprising a Non-Terrestrial Network "NTN", the network comprising the base station and a terminal configured to communicate with the base station via an air interface provided by infrastructure equipment of the NTN, the method comprising:

determining that a first uplink transmission is to be transmitted by the terminal;

determining that the terminal will obtain, during a first time period, position information for the terminal; and scheduling first uplink resources for the terminal to transmit the first uplink transmission, wherein the first uplink resources are scheduled at a point in time selected after the first time period.

Clause 2. The method of Clause 1, further comprising:

transmitting a downlink transmission to the terminal, wherein the first uplink transmission is associated with the downlink transmission;

transmitting a delay indication to the terminal, the delay indication identifying the selected point in time.

Clause 3. The method of Clause 2, further comprising:

sending downlink control information identifying downlink resources for the downlink transmission;

wherein the downlink control information is associated with default uplink resources for the associated default uplink transmission; and wherein the downlink control information comprises the delay indication, the delay indication identifying the selected point in time by identifying a delay relative to the default uplink resources.

Clause 4. The method of Clause 2 or 3 wherein the delay indication identifies one or more of: a time period; a number of one or more sub-frames; and a number of one or more DRX cycles.

Clause 5. The method of any one of Clauses 2-4 wherein, after transmitting the downlink transmission and upon determining that the terminal has transmitted an initial access message, transmitting a second downlink transmission to the terminal and scheduling the first uplink resources for the terminal to transmit the first uplink transmission.

Clause 6. The method of any preceding Clause further comprising determining that the terminal has not transmitted an expected uplink transmission in uplink resources allocated for the expected uplink transmission;

upon determining that the terminal has not transmitted the expected uplink transmission, determining that the first uplink transmission is to be transmitted by the terminal;

transmitting to the terminal a notification identifying the first uplink resources.

Clause 7. The method of any preceding Clause further comprising transmitting a wake-up signal for the terminal at a first point in time, the first point in time being before the first time period.

Clause 8. The method of any preceding Clause wherein, upon determining that the terminal has transmitted an initial access message, scheduling the first uplink resources for the terminal to transmit the first uplink transmission.

Clause 9. The method of any preceding Clause wherein determining that the terminal will obtain, during a first time period, position information for the terminal is based on one or more of:

a time elapsed since the terminal last communicated on the uplink;

a time elapsed since the terminal last received communications on the downlink;

a time elapsed since the base station last sent timing and frequency information to the terminal; and a time elapsed since the terminal last obtained position information.

Clause 10. A method of operating a terminal in a mobile telecommunications system comprising a Non-Terrestrial Network "NTN", the network comprising a base station and the terminal configured to communicate with the base station via an air interface provided by infrastructure equipment of the NTN, the method comprising:

receiving a downlink signal from the base station;

in response to the downlink signal and during a first time period, obtaining position information for the terminal;

synchronising with the base station using the obtained position information; and once synchronised, transmitting a first uplink transmission to the base station.

Clause 11. The method of Clause 10, wherein the downlink signal comprises one or more of:

downlink control information associated with a downlink transmission;

downlink control information associated with a downlink transmission and identifying a delay associated with a position information procedure;

a wake-up signal; and a wake-up signal associated with a position information procedure.

Clause 12. The method of Clause 10 or 11, wherein the downlink signal comprises downlink control information associated with a downlink transmission, the downlink transmission being associated with the first uplink transmission and with corresponding other uplink resources, the method further comprising:

determining the other uplink resources are provided in a second time period which is during or before the first time period;

receiving a second downlink signal identifying first uplink resources provided in a third time period after the first time period;

transmitting the first uplink transmission using the first uplink resources.

Clause 13. The method of any one of Clauses 10 to 12, further comprising:

upon synchronising with the base station, transmitting an initial access message to the base station;

receiving a second downlink signal identifying first uplink resources for the uplink transmission; and transmitting the first uplink transmission to the base station using the first uplink resources.

Clause 14. A method for use in a mobile telecommunications system comprising a Non-Terrestrial Network "NTN", the network comprising a base station and a terminal configured to communicate with the base station via an air interface provided by infrastructure equipment of the NTN, the method comprising:

the terminal receiving a downlink signal from the base station;

determining that a first uplink transmission is to be transmitted by the terminal;

determining that the terminal will obtain, during a first time period, position information for the terminal;

the base station scheduling first uplink resources for the terminal to transmit the first uplink transmission, wherein the first uplink resources are scheduled at a point in time selected after the first time period;

in response to the downlink signal and during the first time period, the terminal obtaining position information for the terminal; and the terminal transmitting, using the obtained position information, the first uplink transmission to the base station using the first uplink resources.

Clause 15. The method of Clause 14 comprising the terminal operating according to any one of Clauses 10 to 13 and the base station operating according to any one of Clauses 1 to 9.

Clause 16. A base station for use in a mobile telecommunications system comprising a Non-Terrestrial Network "NTN", the network comprising the base station and a terminal configured to communicate with the base station via an air interface provided by infrastructure equipment of the NTN, the base station being configured to:

determine that a first uplink transmission is to be transmitted by the terminal;

determine that the terminal will obtain, during a first time period, position information for the terminal; and schedule first uplink resources for the terminal to transmit the first uplink transmission, wherein the first uplink resources are scheduled at a point in time selected after the first time period.

Clause 17. The base station of Clause 16 wherein the base station is further configured to implement the method of any one of Clauses 1 to 9.

Clause 18. Circuitry for a base station in a mobile telecommunications system comprising a Non-Terrestrial Network "NTN" wherein the circuitry comprises a controller element and a transceiver element configured to operate together to connect to a terminal of the network via an air interface provided by infrastructure equipment of the NTN, wherein the controller element and the transceiver element are further configured to operate together to determine that a first uplink transmission is to be transmitted by the terminal;

determine that the terminal will obtain, during a first time period, position information for the terminal; and schedule first uplink resources for the terminal to transmit the first uplink transmission, wherein the first uplink resources are scheduled at a point in time selected after the first time period.

Clause 19. Circuitry for a base station in a mobile telecommunications system comprising a Non-Terrestrial Network "NTN" wherein the circuitry comprises a controller element and a transceiver element configured to operate together to connect to a terminal of the network via an air interface provided by infrastructure equipment of the NTN, wherein the controller element and the transceiver element are further configured to operate together to implement the method of any one of Clauses 1 to 9

Clause 20. A terminal for use in a mobile telecommunications system comprising a Non-Terrestrial Network "NTN", the network comprising a base station and the terminal wherein the terminal is configured to communicate with the base station via an air interface provided by infrastructure equipment of the NTN, the terminal being further configured to:

receive a downlink signal from the base station;

obtain, in response to the downlink signal and during a first time period, position information for the terminal;

synchronise with the base station using the obtained position information; and transmit, once synchronised, a first uplink transmission to the base station.

Clause 21. The terminal of Clause 19 further configured to implement the method of any of Clauses 10 to 13.

Clause 22. Circuitry for a terminal in a mobile telecommunications system comprising a Non-Terrestrial Network "NTN" wherein the circuitry comprises a controller element and a transceiver element configured to operate together to connect to a base station of the network via an air interface provided by infrastructure equipment of the NTN, wherein the controller element and the transceiver element are further configured to operate together to receive a downlink signal from the base station;

obtain, in response to the downlink signal and during a first time period, position information for the terminal;

synchronise with the base station using the obtained position information; and transmit, once synchronised, a first uplink transmission to the base station.

Clause 23. Circuitry for a terminal in a mobile telecommunications system comprising a Non-Terrestrial Network "NTN" wherein the circuitry comprises a controller element and a transceiver element configured to operate together to connect to a base station of the network via an air interface provided by infrastructure equipment of the NTN, wherein the controller element and the transceiver element are further configured to operate together to implement the method of any one of Clauses 10 to 13.

Clause 24. A system for use in a Non-Terrestrial Network "NTN", the system comprising a base station according to Clause 16 or 17 and a terminal according to Clause 20 or 21.

REFERENCES

[1] TR 38.811, "Study on New Radio (NR) to support non terrestrial networks (Release 15)", 3rd Generation Partnership Project, September 2020.

[2] Holma H. and Toskala A, "LTE for UMTS OFDMA and SC-FDMA based radio access", John Wiley and Sons, 2009.

[3] TR 38.821, "Solutions for NR to support Non-Terrestrial Networks (NTN) (Release 16)", 3rd Generation Partnership Project, December 2019.

The invention claimed is:

1. A method of operating a base station in a mobile telecommunications system comprising a Non-Terrestrial Network (NTN), the NTN comprising the base station and a terminal configured to communicate with the base station via an air interface provided by infrastructure equipment of the NTN, the method comprising:

determining that a first uplink transmission is to be transmitted by the terminal;

determining that the terminal will obtain, during a first time period, position information for the terminal; and scheduling first uplink resources for the terminal to transmit the first uplink transmission, wherein the first uplink resources are scheduled at a point in time selected after the first time period, wherein determining that the terminal will obtain, during the first time period, position information for the terminal is based on one or more of:

a time elapsed since the terminal last communicated on the first uplink;

a time elapsed since the terminal last received communications on a downlink; and a time elapsed since the base station last sent timing and frequency information to the terminal;

wherein scheduling the first uplink resources for the terminal to transmit the first uplink transmission includes:

determining that the terminal will obtain new position information for the terminal, wherein said determining is based on a time elapsed since the base station last sent timing and frequency information to the terminal being greater than a predetermined threshold;

transmitting a delay indication to the terminal, the delay indication identifying a point in time selected after the first time period; and scheduling the first uplink resources at the point in time selected after the first time period, the point in time being that identified by the delay indication.

2. The method of claim 1, further comprising:

transmitting a downlink transmission to the terminal, wherein the first uplink transmission is associated with the downlink transmission;

transmitting the delay indication to the terminal, the delay indication identifying the selected point in time.

3. The method of claim 2, further comprising:

sending downlink control information identifying downlink resources for the downlink transmission;

wherein the downlink control information is associated with default uplink resources for the associated default uplink transmission; and wherein the downlink control information comprises the delay indication, the delay indication identifying the selected point in time by identifying a delay relative to the default uplink resources.

4. The method of claim 2, wherein the delay indication identifies one or more of:

a time period;

a number of one or more sub-frames; and a number of one or more DRX cycles.

5. The method of claim 2, wherein, after transmitting the downlink transmission and upon determining that the terminal has transmitted an initial access message, transmitting a second downlink transmission to the terminal and scheduling the first uplink resources for the terminal to transmit the first uplink transmission.

6. The method of claim 1, further comprising determining that the terminal has not transmitted an expected uplink transmission in uplink resources allocated for the expected uplink transmission;

upon determining that the terminal has not transmitted the expected uplink transmission, determining that the first uplink transmission is to be transmitted by the terminal;

transmitting to the terminal a notification identifying the first uplink resources.

7. The method of claim 1, further comprising transmitting a wake-up signal for the terminal at a first point in time, the first point in time being before the first time period.

8. The method of claim 1, wherein, upon determining that the terminal has transmitted an initial access message, scheduling the first uplink resources for the terminal to transmit the first uplink transmission.

9. The method of claim 1, wherein determining that the terminal will obtain, during a first time period, position information for the terminal is based on the time elapsed since the terminal last received communications on the downlink being greater than a predetermined threshold.

10. A method of operating a terminal in a mobile telecommunications system comprising a Non-Terrestrial Network (NTN), the NTN comprising a base station and the terminal configured to communicate with the base station via an air interface provided by infrastructure equipment of the NTN, the method comprising:

receiving a downlink signal from the base station;

in response to the downlink signal and during a first time period, obtaining position information for the terminal;

synchronising with the base station using the obtained position information; and once synchronised, transmitting a first uplink transmission to the base station, wherein obtaining position information for the terminal during the first time period is based on one or more of:

a time elapsed since the terminal last communicated on the first uplink;

a time elapsed since the terminal last received communications on a downlink; and a time elapsed since the base station last sent timing and frequency information to the terminal; wherein prior to obtaining position information, the terminal determines that synchronisation information for the first uplink transmission is invalid, said invalidity being determined based on a time elapsed since the terminal last received communications on the downlink being greater than a predetermined threshold;

the receiving downlink signal comprises receiving a signal from the base station that comprises downlink control information (DCI) associated with a downlink transmission and identifying a delay associated with a position information procedure; and the transmitting the first uplink transmission occurs at a point in time defined by the delay associated with the position information procedure.

11. The method of claim 10, wherein the downlink signal comprises one or more of:

downlink control information associated with a downlink transmission;

downlink control information associated with a downlink transmission and identifying a delay associated with a position information procedure;

a wake-up signal; and a wake-up signal associated with a position information procedure.

12. The method of claim 10, wherein the downlink signal comprises downlink control information associated with a downlink transmission, the downlink transmission being associated with the first uplink transmission and with corresponding other uplink resources, the method further comprising:

determining the other uplink resources are provided in a second time period which is during or before the first time period;

receiving a second downlink signal identifying first uplink resources provided in a third time period after the first time period;

transmitting the first uplink transmission using the first uplink resources.

13. The method of claim 10, further comprising:

upon synchronising with the base station, transmitting an initial access message to the base station;

receiving a second downlink signal identifying first uplink resources for the first uplink transmission; and transmitting the first uplink transmission to the base station using the first uplink resources.

14. The method according to claim 10, wherein obtaining position information for the terminal during the first time period is based on the time elapsed since the terminal last received communications on the downlink being greater than a predetermined threshold.

15. A terminal for use in a mobile telecommunications system comprising a Non-Terrestrial Network (NTN), the NTN comprising a base station and the terminal wherein the terminal is configured to communicate with the base station via an air interface provided by infrastructure equipment of the NTN, the terminal being further configured to:

receive a downlink signal from the base station;

obtain, in response to the downlink signal and during a first time period, position information for the terminal;

synchronise with the base station using the obtained position information; and transmit, once synchronised, a first uplink transmission to the base station, wherein obtaining position information for the terminal during the first time period is based on one or more of:

a time elapsed since the terminal last communicated on the first uplink;

a time elapsed since the terminal last received communications on a downlink; and a time elapsed since the base station last sent timing and frequency information to the terminal;

wherein the terminal is further configured to:

determine, prior to obtaining position information, that synchronisation information for the first uplink transmission is invalid, the first uplink transmission being invalid is determined based on a time elapsed since the terminal last received communications on the downlink being greater than a predetermined threshold;

wherein the downlink signal comprises downlink control information (DCI) associated with a downlink transmission and identifying a delay associated with a position information procedure; and wherein the terminal transmits the first uplink transmission at a point in time defined by the delay associated with the position information procedure.

16. The terminal according to claim 15, wherein the terminal being further configured to obtain position information for the terminal during the first time period is based on the time elapsed since the terminal last received communications on the downlink being greater than a predetermined threshold.

* * * * *